(12) United States Patent
Shimizu et al.

(10) Patent No.: US 8,004,984 B2
(45) Date of Patent: Aug. 23, 2011

(54) ROUTING CONTROL TECHNIQUE IN MPLS

(75) Inventors: Takao Shimizu, Kawasaki (JP); Kiyoharu Makinose, Kawasaki (JP); Norikazu Matsukawa, Kawasaki (JP); Naoyuki Takahashi, Kawasaki (JP); Kazuhiro Iitsuka, Kawasaki (JP); Michio Kitade, Kawasaki (JP); Hideo Yamaguchi, Kawasaki (JP); Yoko Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1244 days.

(21) Appl. No.: 11/296,342

(22) Filed: Dec. 8, 2005

(65) Prior Publication Data

US 2006/0159084 A1 Jul. 20, 2006

(30) Foreign Application Priority Data

Jan. 14, 2005 (JP) ................................. 2005-007055

(51) Int. Cl.
*H04L 12/26* (2006.01)
(52) U.S. Cl. ........................ 370/232; 370/395.5; 709/225
(58) Field of Classification Search .................. 370/389, 370/395.5, 395.31, 216, 218, 225, 228, 230–234, 370/395.21, 395.2; 709/238–241, 224, 225, 709/226, 244
See application file for complete search history.

(56) References Cited

U.S. PATENT DOCUMENTS

| | | | | |
|---|---|---|---|---|
| 5,933,422 A | * | 8/1999 | Kusano et al. ................. 370/228 |
| 6,052,361 A | * | 4/2000 | Ansari et al. ................... 370/232 |
| 6,134,589 A | * | 10/2000 | Hultgren ........................ 709/239 |
| 6,956,849 B1 | * | 10/2005 | Yip et al. ................. 370/395.21 |
| 6,978,394 B1 | * | 12/2005 | Charny et al. ................. 370/228 |
| 7,047,316 B2 | * | 5/2006 | Iwata et al. .................... 709/240 |
| 7,120,118 B2 | * | 10/2006 | Rajagopal et al. ............ 370/216 |
| 7,283,477 B1 | * | 10/2007 | Fedyk et al. ................. 370/389 |
| 7,284,051 B1 | | 10/2007 | Okano et al. |
| 7,500,013 B2 | * | 3/2009 | Dziong et al. ................ 709/238 |
| 7,593,321 B2 | * | 9/2009 | Galand et al. ................ 370/218 |
| 7,599,298 B2 | * | 10/2009 | Marasli et al. ................ 709/241 |
| 2001/0047409 A1 | * | 11/2001 | Datta et al. .................... 370/232 |

(Continued)

FOREIGN PATENT DOCUMENTS

JP 2000-196677 7/2000

(Continued)

OTHER PUBLICATIONS

Japanese Office Action issued Dec. 21, 2010 in corresponding Japanese Application No. 2005-007055.

(Continued)

*Primary Examiner* — Kwang B Yao
*Assistant Examiner* — Jeffrey M Rutkowski
(74) *Attorney, Agent, or Firm* — Staas & Halsey LLP

(57) ABSTRACT

This invention is to provide a technique enabling efficient routing in the entire network by totally viewing a state of the entire network from a specific server. An information processing method for managing paths between arbitrary nodes in a specific network according to the invention, includes: obtaining data concerning a utilization state of each link constituting a path, from associated nodes in the specific network; and calculating a value of dynamic transmission bandwidth in an entire path by using the data concerning the utilization state of each link constituting the path, and storing the calculated value into a management data storage. By the dynamic transmission bandwidth, that is, bandwidth, which can actually be used for communication to be carried out from now, it becomes possible to carry out efficient routing.

8 Claims, 17 Drawing Sheets

U.S. PATENT DOCUMENTS

| | | | |
|---|---|---|---|
| 2002/0037010 A1 | 3/2002 | Yamauchi | |
| 2002/0069274 A1* | 6/2002 | Tindal et al. | 709/224 |
| 2004/0184483 A1 | 9/2004 | Okamura et al. | |

FOREIGN PATENT DOCUMENTS

| | | |
|---|---|---|
| JP | 2001-024709 | 1/2001 |
| JP | 2001-069146 | 3/2001 |
| JP | 2002-111725 | 4/2002 |
| JP | 2002-252634 | 9/2002 |
| JP | 2004-236198 | 8/2004 |

OTHER PUBLICATIONS

Sakurai Toshiyuki et al., "Traffic Engineering for Centralized Traffic Control over Large Scale MPLS Network", IEICE Technical Report, vol. 102, No. 694, IN2002-284, Feb. 28, 2003.

Japanese Office Action issued on Jun. 29, 2010 in corresponding Japanese Patent Application 2005-007055.

* cited by examiner

| LABEL | VIRTUAL LABEL | LABEL |
|---|---|---|
| L11 | L11r | Lm |
| L12 | L12r | |

| LINK | LABEL |
|---|---|
| ℓ 121 | L11 |
| ℓ 123 | L12 |
| ℓ 124 | Lm |
| ⋮ | ⋮ |
| | |

| LINK(Lid) | LABEL(La) | | |
|---|---|---|---|
| ℓ 1015 | A | B | C |
| ⋮ | ⋮ | ⋮ | ⋮ |
| ℓ 5001 | X | Y | Z |

| LINK (Lid) | Bs | RTid | Pri-$\rho$ | |
|---|---|---|---|---|
| | | | 0 | 1 |
| $\ell$ 1015 | 100 | RT10 | 20% | 15% |
| | | RT15 | 30% | 20% |
| ⋮ | ⋮ | ⋮ | ⋮ | ⋮ |
| $\ell$ 1015 | 100 | RT10 | 30% | 20% |
| | | RT15 | 20% | 15% |
FIG.8
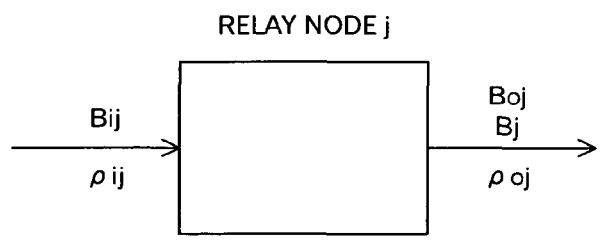
FIG.12
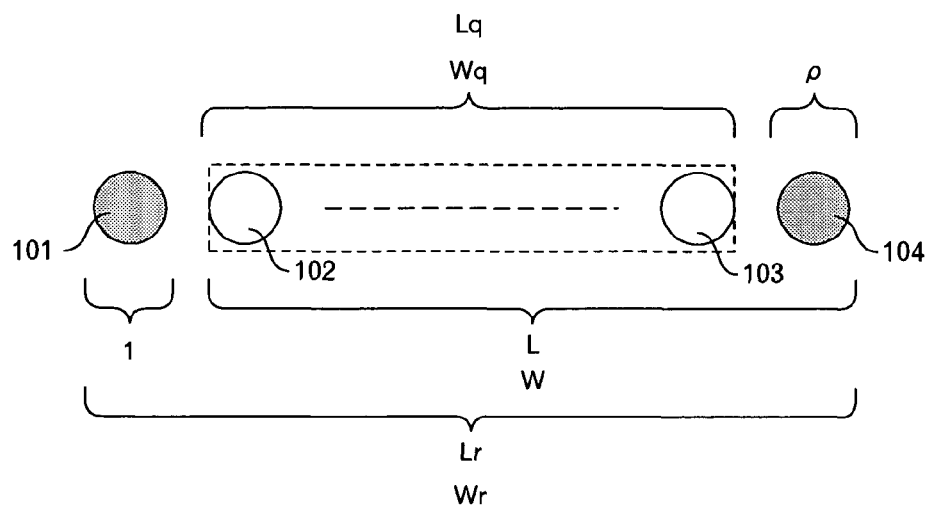
FIG.13

| SNo | SNd | LP# | FAILURE | | Lr | Bs | Bs BN | Cal | Pri | BdU | BdU BN | BdD | BdD BN | LABEL DATA | | | | | | |
|---|---|---|---|---|---|---|---|---|---|---|---|---|---|---|---|---|---|---|---|---|
| | | | U | D | | | | | | | | | | La | ρU | ρD | ... | La | ρU | ρD |
| 10 | 20 | 1 | — | — | 10.1 | 100 | (La) | M/D | 0 | 60 | (La) | 40 | (La) | A | 20% | 30% | | X | 30% | 20% |
| | | | | | | | | | | | | | | | 15% | 20% | | | 20% | 15% |
| | | 2 | — | — | 10.2 | 80 | (La) | M/D | 1 | 70 | (La) | 60 | (La) | B | 20% | 25% | | Y | 25% | 20% |
| | | | | | | | | | | | | | | | 15% | 20% | | | 20% | 15% |
| | | 3 | — | — | 10.3 | 60 | (La) | M/D | 0 | 30 | (La) | 50 | (La) | C | 20% | 30% | | Z | 30% | 20% |
| | | | | | | | | | | | | | | | 15% | 25% | | | 20% | 15% |

FIG.9

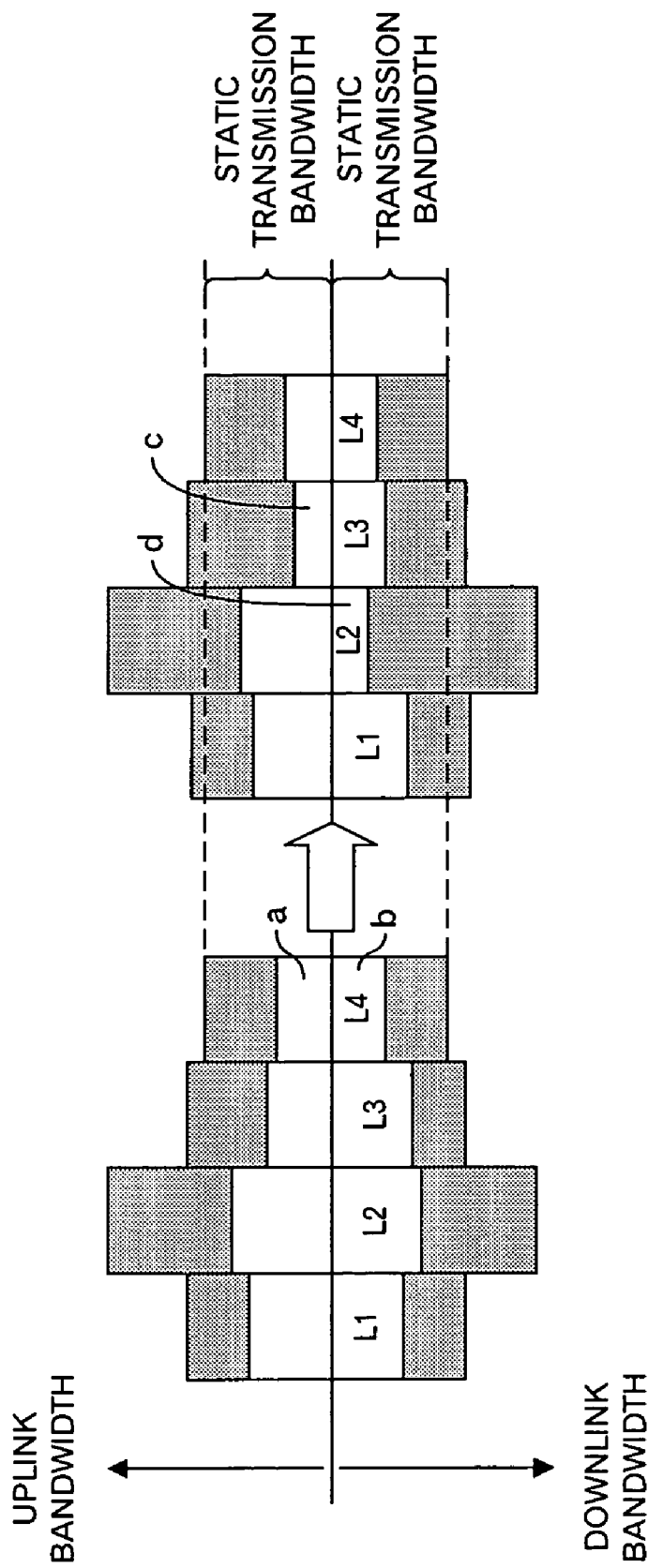

| SERVER# | To | BdDb | INDEX |
|---|---|---|---|
| S1 | 80 | 30 | 30 |
| S2 | 60 | 50 | 50 |
| S3 | 40 | 50 | 40 |

| SERVER# | Ti | BdUb | INDEX |
|---|---|---|---|
| S1 | 60 | 50 | 50 |
| S2 | 40 | 60 | 40 |
| S3 | 20 | 40 | 20 |

| SERVER# | To | BdDb | Ti | BdUb | D1 | U1 | INDEX |
|---|---|---|---|---|---|---|---|
| S1 | 120 | 30 | 60 | 50 | 30 | 50 | 30 |
| S2 | 80 | 50 | 40 | 60 | 50 | 40 | 40 |
| S3 | 40 | 50 | 20 | 40 | 40 | 20 | 20 |

ROUTING CONTROL TECHNIQUE IN MPLS

TECHNICAL FIELD OF THE INVENTION

This invention relates to a technique in a network.

BACKGROUND OF THE INVENTION

A conventional path control technique for a network has following problems: (a) it is impossible to detect routes being congested, in advance; (b) symmetric routing in uplink and downlink cannot be forcibly carried out; (c) it is impossible to reflect the state of a server in routing; (d) it requires a load and/or time to check the states of routes; and (e) it requires a load and/or time to carry out a dynamic processing. Especially, because the Internet, which has come into wide use in recent years, has developed without considering the entire efficiency improvement, it has a lot of problems in efficiency. For example, as for the routing and switching, because autonomous operations are assumed, the protocol is complicated, and there are a lot of cases in which the state in the network is unknown.

For example, JP-A-2001-69146 discloses a technique, whose load for a packet switched network is light, to measure a free bandwidth of a desired section. Specifically, plural test packets are transmitted via one route for each node to two transmission target nodes positioned at both ends of a section to be measured from a measurement apparatus, respectively, to measure packet transfer delay time up to each of the two transmission target nodes. Then, the minimum value and an average value of the measured values are calculated, and from those, a sum of average waiting times in a queue of each node through which packets pass from the measurement apparatus to the transmission target nodes is calculated. Further, from a difference between the sums of the average waiting times, which are obtained for the respective two transmission target nodes, an average section waiting time in a queue to the section to be measured is calculated. Finally, a queue model of the section to be measured is formed, and based on the average section waiting time, a calculation using the queue model is carried out to obtain the free bandwidth. Such a method of transmitting test packets and measuring the delay time is not always effective, because there is still a measurement load.

SUMMARY OF THE INVENTION

Therefore, an object of this invention is to provide a technique enabling efficient routing in the entire network by totally viewing a state of the entire network from a specific server.

In addition, another object of the invention is to provide a new technique to grasp a network state.

Furthermore, still another object of the invention is to provide a technique enabling appropriate routing according to the network state.

An information processing method according to a first aspect of the invention is an information processing method for managing paths between arbitrary nodes in a specific network, which includes: obtaining data concerning a utilization state of each link constituting a path, from associated nodes in the specific network; and calculating a value of dynamic transmission bandwidth in an entire path by using the data concerning the utilization state of each link constituting the path, and storing the calculated value into a management data storage. By identifying, for each path, the dynamic transmission bandwidth, that is, bandwidth, which can actually be used for communication to be carried out from now, it becomes possible to carry out efficient routing.

In addition, a unique label may be allocated to each link constituting the path, and the management data storage may store a path in association with a label of each link constituting the path. Then, packet routing may be carried out by data to identify a next label in the path including a link relating to the designated label, from the designated label, in a node in the specific network. Because the unique label is allocated to each link constituting the path, a path is identified when the label is identified. Further, when one label is identified, the next label and the corresponding link are also identified. Therefore, in each node, the routing can be easily carried out. In addition, it is possible to carry out the routing by using the same label in the uplink and downlink.

Furthermore, a label may be allocated to each link constituting a path, and the same label may be allocated to a specific link commonly used in a plurality of paths. The management data storage may store a path and a label of a link constituting the path in association with data to identify a link branch in a reverse direction of the path in a case where the links constituting the path include the specific link. Then, in a node in the specific network, packet routing is controlled by data to identify a next label from a designated label, in the path including a link relating to the designated label, and by data to identify, from the data to identify the link branch and the designated label, a next label in the path including the link relating to the designated label in a case where the node is positioned at a downlink branch side of the specific link. In this way, because the same label is used for the specific link, the number of the label to be managed can be reduced, and even in the reverse direction, by using the data to identify the link branch, it becomes possible to carry out appropriate routing.

An information processing method according to a second aspect of the invention is an information processing method executed by a management server having a data storage to manage dynamic transmission bandwidths with respect to a plurality of paths between arbitrary nodes in a specific network and including: upon receiving a path setting request including data concerning a destination of a packet, referring to the data storage to identify nodes positioned at both ends of the path and a routing policy; identifying path candidates from the nodes positioned at both ends of the path and determining an optimum path among the path candidates based on the identified routing policy; and transmitting data to identify the optimum path to a requesting source of the path setting request. Such a processing can make it possible to identify the optimum path according to a dynamic state of the network and the routing policy to which the characteristic of the communication the route control is carried out is reflected.

In addition, the aforementioned identifying and determining may include: referring to the data storage to identify path candidates from the nodes positioned at both ends of the path; and when the identified routing policy is an asymmetric routing in uplink and downlink, referring to the data storage to identify a path whose value of the dynamic transmission bandwidth in uplink is largest and a path whose value of the dynamic transmission bandwidth in downlink is largest among the path candidates. Appropriate paths in uplink and downlink are identified.

Furthermore, the identifying and determining may further include: when the identified routing policy is a symmetric routing, and it is assumed that a difference value between an uplink traffic amount and a downlink traffic amount or a rate thereof is within a predetermined range, referring to the data storage to determine a path whose values of the dynamic transmission bandwidths in uplink and downlink satisfy a predetermined condition among the path candidates. For example, when the traffic amounts in both of uplink and downlink are almost identical, a path that the difference between the dynamic transmission bandwidths in uplink and downlink is least, or a path that the average of the dynamic transmission bandwidths in uplink and downlink is largest is selected.

In addition, the aforementioned identifying and determining may further include: when the identified routing policy is a symmetric routing, and it is assumed that the difference value between the uplink traffic amount and the downlink traffic amount or a rate thereof is out of the predetermined range, referring to the data storage to identify a path whose value of the dynamic transmission bandwidth in a direction in which the traffic amount is assumed to be larger is largest. For example, when the traffic is biased to only one direction, for example, an upload or download is carried out, the optimum path is identified by such a processing.

An information processing method according to a third aspect of the invention is an information processing method executed by a management server having a data storage to manage dynamic transmission bandwidths with respect to a plurality of paths between arbitrary paths in the specific network, and including: upon receiving a destination determination request including data concerning a source and a plurality of destination candidates of a packet and data concerning server loads of the plurality of destination candidates, identifying a routing policy based on data concerning the destination candidate of the packet, and referring to the data storage to identify path candidates for each destination candidate based on the data concerning the source and the plurality of destination candidates of the packet; and determining an optimum destination candidate and a path candidate according to the routing policy based on values of dynamic transmission bandwidths of the path candidates for each destination candidate and the data concerning the server loads of the plurality of destination candidates, which are stored in the data storage.

Thus, the destination and path are identified taking into account dynamic states of the servers in addition to the dynamic state of the network and the routing policy to which the characteristic of the communication the route control is carried out are reflected. Incidentally, the destination determination request may be transmitted from, for example, Dynamic Domain Name Server (DDNS). In such a case, the determined destination candidate is notified to the DDNS, and the determined path candidate is notified to a router nearest to a client terminal of a packet transmission source.

In addition, the aforementioned identifying and referring may include: identifying nodes positioned at both ends of a path for each destination candidate based on the data concerning the source and the plurality of destination candidates of the packet; and referring to the data storage to select, as path candidates, one or a plurality of paths that are identified from nodes positioned at the both ends for each destination candidate, based on a predetermined condition. A path having the maximum dynamic transmission bandwidth in uplink and a path having the maximum dynamic transmission bandwidth in downlink may be selected or either thereof may be selected, as path candidate(s).

Moreover, the aforementioned determining may include: calculating an index value according to the routing policy for each destination candidate from the values of the dynamic transmission bandwidths of the path candidates for each destination candidate and the data concerning the server loads of the plurality of destination candidates, which are stored in the data storage; and determining the optimum destination candidate and path candidate based on the calculated index values.

A router according to a fourth aspect of the invention is a router for carrying out routing according to an instruction from a management server for managing paths between arbitrary nodes in a specific network, including: a data storage; and a routing unit that carries out packet routing according to data concerning a link included in a path designated by the management server. In addition, a label is allocated to each link constituting a path, and the same label is allocated to a specific link commonly used for a plurality of paths, and the data concerning the link is the label. Moreover, the data storage stores data to identify, from a designated label, a next label in the path including a link relating to the designated label, and data to identify a next label in the path including a link relating to the designated label and a link relating to the next label from data to identify a link branch in a reverse direction of the path and the designated label in a case where this router is positioned at a downlink branch side of the specific link. By using this router for the aforementioned management server in this way, it becomes possible to carry out efficient routing in the entire network.

It is possible to create a program for causing a computer to execute the information processing method according to this invention, and this program is stored in a storage medium or a storage device such as a flexible disk, a CD-ROM, an optical magnetic disk, a semiconductor memory, and a hard disk. Further, the program may be distributed as a digital signal through a network. Incidentally, intermediate processing results are temporarily stored in a storage device such as a main memory.

BRIEF DESCRIPTION OF THE DRAWINGS

FIG. 8 is a diagram showing an example of a link data table;

FIG. 9 is a diagram showing an example of an LP table;

FIGS. 11A and 11B are diagram to explain a static transmission bandwidth and a dynamic transmission bandwidth of a relay node;

FIG. 12 is a diagram to explain a relationship between and a utilization ratio and the dynamic bandwidth of a relay node;

FIG. 13 is a diagram to explain a queue model;

FIG. 19 is a diagram showing a processing flow (a third portion) to carry out routing along with the optimum LP;

DETAILED DESCRIPTION OF THE PREFERRED EMBODIMENTS

Figure 1:
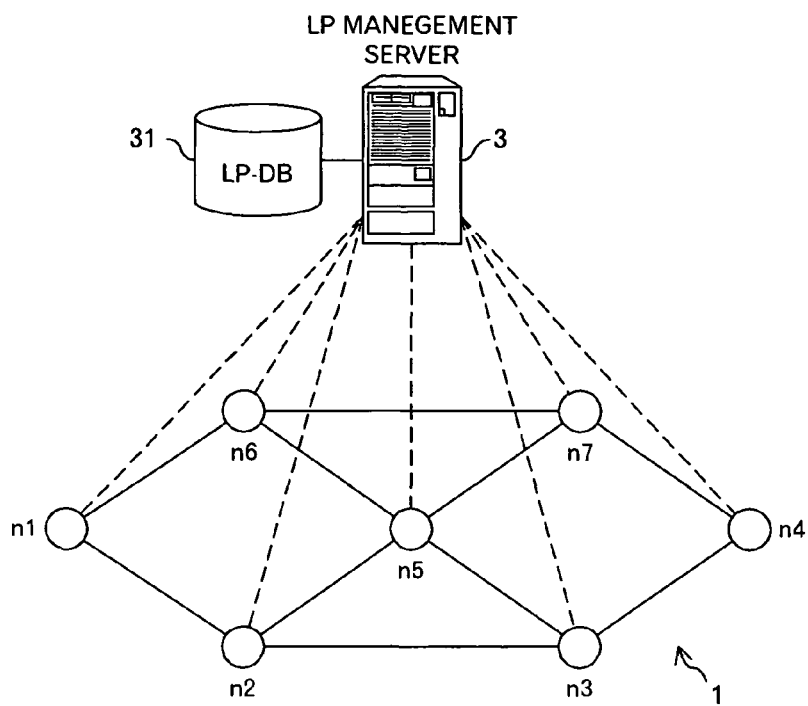
FIG. 1 is a diagram schematically showing a network according to an embodiment of the invention.

FIG. 1 is a network conceptual diagram according to an embodiment of this invention. In this embodiment, an LP management server 3 is connected to a network including routers such as nodes n1 to n7. LP is a notation created by abbreviating a Label switched Path in the Multi Protocol Label Switching (MPLS). The LP management server 3 determines the optimum route (LP) between arbitrary nodes in the network 1. That is, in this embodiment, the routing is not controlled in each node unlike the conventional technique, and the routing in the network 1 is concentrically controlled by the LP management server 3. As indicated by dotted lines in FIG. 1, each node is directly or indirectly controlled by the LP management server 3. For such a processing, the LP management server 3 manages an LP-DB 31 to hold data concerning LPs. Data held in the LP-DB 31 will be described later in detail.

Figure 2A:
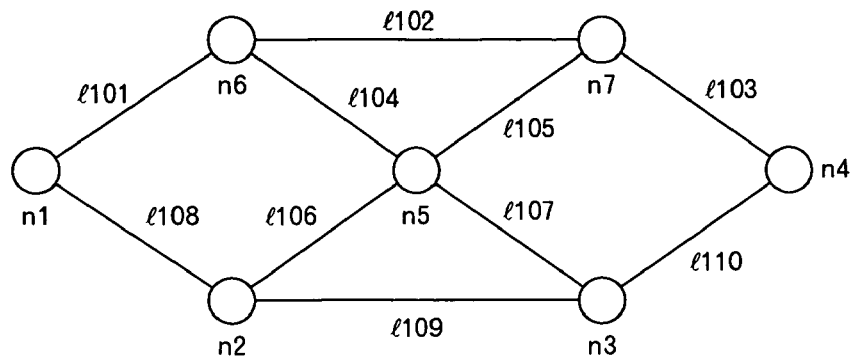
FIGS. 2A to 2C are conceptual diagrams of networks.

Here, the basic concept of the routing in a network in this embodiment will be described. As shown in FIG. 2A, a link 1101 is provided between a node n1 and a node n6, and a link 1102 is provided between the node n6 and a node n7. A link 1103 is provided between the node n7 and a node n4, and a link 1104 is provided between the node n6 and a node n5. A link 1105 is provided between the node n5 and the node n7, and a link 1106 is provided between the node n5 and a node n2. A link 1107 is provided between the node n5 and a node n3, and a link 1108 is provided between the node n2 and the node n1. A link 1109 is provided between the node n2 and the node n3, and a link 1110 is provided between the node n3 and the node n4.

Figure 2B:
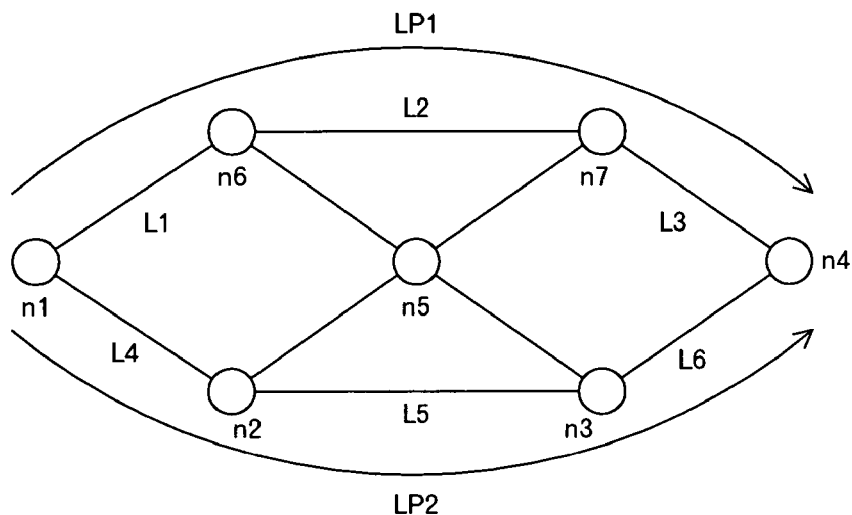

In such a network, as shown in FIG. 2B, LP1 and LP2 exist as paths from the node n1 to the node n4. LP1 is composed of the link 1101, the link 1102, and the link 1103. In the case of the path LP1, a label L1 is assigned to the link 1101, a label L2 is assigned to the link 1102, and a label L3 is assigned to the link 1103. In addition, LP2 is composed of the link 1108, the link 1109, and the link 1110. In the case of the path LP2, a label L4 is assigned to the link 1108, a label L5 is assigned to the link 1109, and a label L6 is assigned to the link 1110.

Figure 2C:
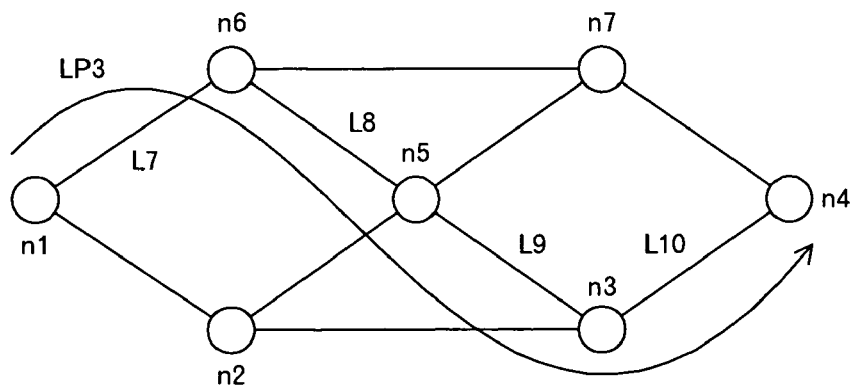

Furthermore, as shown in FIG. 2C, LP3 exists as another path from the node n1 to the node n4. LP3 is composed of the link 1101, the link 1104, the link 1107, and the link 1110. In the case of the path LP3, a label L7 is assigned to the link 1101, a label L8 is assigned to the link 1104, a label L9 is assigned to the link 1107, and a label L10 is assigned to the link 1110.

As such, the link 1101 is commonly used for LP1 and LP3, but different labels are assigned to the same link 1101 in such a manner that the label L1 is assigned thereto in LP1, and the label L7 is assigned thereto in LP3. That is, basically, different labels are assigned to the same link according to LPs even in a case where the same link is used. In order words, a label is uniquely assigned in all LPs. When a label is specified, LP is also specified. Thus, a link relating to a label next to the specified label can be specified. For example, when the label L8 is designated, the link 1104 relating to the label L8 is specified, and the next label L9 is also specified, and then the link 1107 relating to the label L9 is also specified. Therefore, forward routing is possible in each node.

In FIG. 2A, LP from the node n1 to the node n4 is discussed, but the same labels used for the forward LP are also used for reverse LP (RLP: Reverse Label Switched Path) in this embodiment. That is, the reverse LP symmetric with respect to the forward LP is used. In this way, it is possible to commonly use routing information for downlink and uplink, and thus to reduce the amount of data to be managed. More specifically, for example, in the reverse routing, when the label L3 is specified, the label L2 is specified as the next label. That is, it is also possible to carry out reverse routing in each node.

Figure 3A:
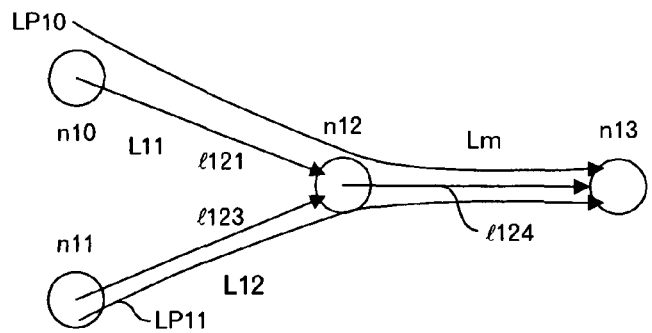
FIGS. 3A and 3B are diagrams to explain a virtual label.
Figure 3B:
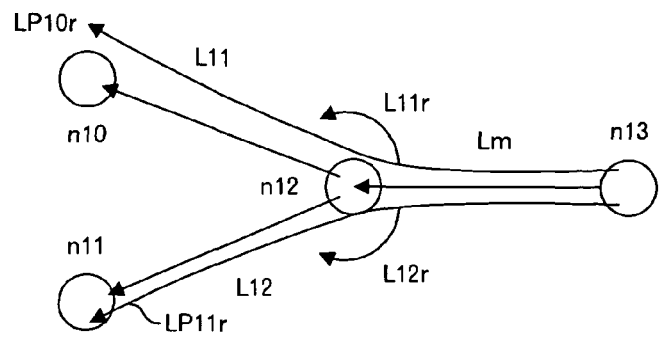

However, according to this configuration, as the number of LPs and the number of nodes become larger, the number of labels ((the number of LPs)×(the number of nodes)) becomes larger. Therefore, the amount of data to be managed is increased. Then, in this embodiment, a label merging is adopted. A simple example is shown in FIGS. 3A and 3B. As shown in FIG. 3A, in a network including nodes n10, n11, n12, and n13, a path from the node n10 to the node n12 is denoted as LP10, and a path from the node nil to the node n12 is denoted as LP11. In addition, a link from the node n10 to the node n12 is denoted as 1121, and a link from the node nil to the node n12 is denoted as 1123. A link from the node n12 to the node n13 is denoted as 1124. In such a case, the same link 1124 is used for the LP10 and LP11, but it is necessary to register different labels every LPs according to the explanation for FIGS. 2A to 2C. However, as described above, in order to reduce the amount of data to be managed, only one label Lm is assigned to the link 1124 by merging the labels for the link 1124. That is, LP10 is composed of the label L11 and the label Lm, and the LP11 is composed of the label L12 and the label Lm. In the node n12, when the label L11 is specified, the label Lm can be specified as the next label for LP10. Similarly, in the node n12, when the label L12 is specified, the label Lm can be specified as the next label for the LP11.

As shown in FIG. 3B, in the case of reverse direction, that is, LP10r from the node n13 to the node n10 and LP11r from the node n13 to the node n11, the reverse direction is not automatically specified unlike the explanation for FIGS. 2A to 2C. That is, even when the label Lm is specified, it is impossible to specify the LP10r or LP11r. As a result, because the next label cannot be specified, it is impossible to carry out the routing. Therefore, in this embodiment, in order to makes it possible to carry out the routing even when the label merging is carried out, a virtual label is introduced to carry out branching in the branch node n12.

The virtual label functions to specify LP, for example, a branch destination label. In an example of FIG. 3B, at the node n12, branch to the label L11 is carried out according to the virtual label L11r. That is, when the LP10r is used, the node n13 transmits a packet, which specifies both the label Lm and the virtual label L11r. Meanwhile, when the LP11r is used, similarly, the node n13 transmits a packet, which specifies both the label Lm and a virtual label L12r. This virtual label is defined for each LP. For example, when a head label of LP is uniquely defined in an MPLS domain, the head label can be used for the virtual label.

Figures 4, 5, 6, 7:
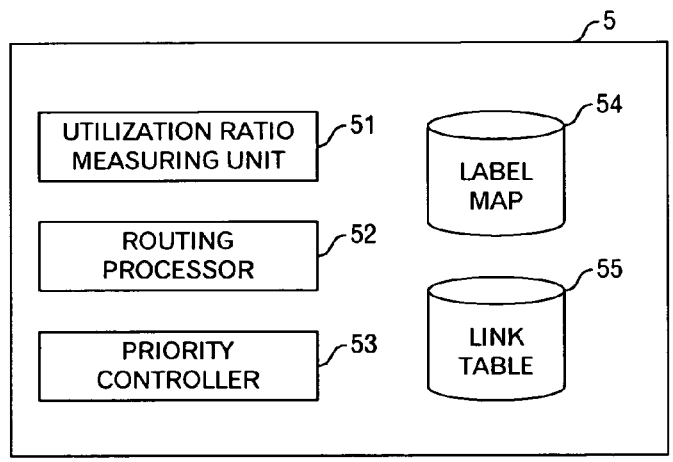
FIG. 4 is a functional block diagram of a router.
FIG. 5 is a diagram showing an example of a label map.
FIG. 6 is a diagram showing an example of a link table in a router.
FIG. 7 is a diagram showing an example of a link table in a LP management server.

Next, a configuration for realizing the basic mechanism shown in FIGS. 2A to 2C and FIGS. 3A and 3B will be described below. FIG. 4 shows a functional block diagram illustrating a router disposed at a node. A router 5 includes a label map 54, a link table 55, a priority controller 53, which conventionally exists, to carry out a processing for priority control such as 8-class priority control, a utilization ratio measuring unit 51 for measuring the utilization ratio of a link for each priority class, and a routing processor 52, which is operatively associated with the priority controller 53, to carry out a packet routing, referring to the routing map 54 and the link table 55.

The label map 54 of the node n12 in FIG. 3A includes data shown in FIG. 5, for example. That is, a table shown in FIG. 5 includes, from the left side thereof, a first label column, a virtual label column, and a second label column, and each record corresponds to one LP. In FIG. 5, data for LP10 is registered in the first record, and because the node n12 is a branch node, the virtual label L11r and the label Lm are registered therein in association with the label L11. Therefore, when a packet to which the label L11 is attached is received from the node n10, it is determined based on the label map 54 that the packet should be transferred to the label Lm. In contrast, when a packet to which the label Lm and the virtual label L12r are attached is received, it is determined based on the label map 54 that the packet should be transferred to the label L12.

Meanwhile, the link table 55 of the node n12 in FIG. 3A includes data shown in FIG. 6, for example. That is, the table shown in FIG. 6 has a link column and a label column, and links and labels are associated with each other therein. As such, when a label can be specified, a link can also be specified. As a result, a port connected to a cable constituting the link in the router 5 is also specified. Therefore, it is possible to carry out the packet routing.

The utilization ratio-measuring unit 51 of the router 5 regularly measures the utilization ratios of the links and notifies them to the LP management server 3. However, when the utilization ratio varies within a predetermined range, the notice may be omitted. Incidentally, in a case where a bottleneck link is included in the links connected to the router 5, the LP management server 3 transmits an intensive monitoring instruction to the router 5. Therefore, when receiving the intensive monitoring instruction, the utilization ratio-measuring unit 51 shortens a monitoring period for the bottleneck link. In a case where, if the utilization ratio varies beyond a predetermined range, its notice is transmitted to the LP management server 3, the utilization ratio measuring unit 51 carries out a processing for narrowing the predetermined range, or the like.

Next, examples of data stored in the LP-DB 31 to realize the basic mechanism shown in FIGS. 2A to 2C and FIGS. 3A and 3B are shown in FIGS. 7 to 9. FIG. 7 shows an example of a link table. Similarly to FIG. 6, the table shown in FIG. 7 includes a column of a link Lid and a column of a label La, and a relationship between a link and a label assigned to the link is registered in the table. Data of links for the entire network is registered in the LP-DB 31. In a case where the configuration of the network is changed, data in the table is also changed.

FIG. 8 shows an example of a link data table. The table shown in FIG. 8 includes a column of a link Lid, a column for a static bandwidth Bs of a link, a column for ID (RTid) of routers connected to both ends of the link, and a column of the link utilization ratio Pri-ρ for each priority. For the simplicity of explanation, it is assumed that priorities of "0" and "1" exist. The utilization ratio measured by the utilization ratio-measuring unit 51 in the router 5 is transmitted to the corresponding LP management server 3, and is then registered in this table.

FIG. 9 shows an example of an LP table. The table shown in FIG. 9 includes a column for a source network address set number (SNo) that indicates a set of network addresses (when one network address exists, the network address is indicated, and when two or more network addresses exist, a representative network address is indicated) under the control of a source edge router, a column for a destination network address set number (SNd) that indicates a set of network addresses under the control of a destination edge router, a column for an order of the static transmission bandwidth Bs of LP that connects SNo and SNd, a column to indicate the state of a failure (uplink U/downlink D), a column for a virtual label in the reverse LP (RLP) (for example, SNo is used. SNo corresponds to a destination side, because of the reverse direction), a column for the LP static transmission bandwidth Bs calculated from the band capacities of respective links constituting the LP, a column for a label BsBN corresponding to a bottleneck link causing the static transmission bandwidth, a column of a transmission bandwidth calculating method Cal to register a case (M) in which a packet size is random or a case (D) in which a packet size is uniform, a column of a priority (Pri) to distinguish a best effort (O) from a highest priority (1), a column of an uplink-side dynamic transmission bandwidth BdU, a column of a label BdUBN corresponding to the bottleneck link causing the uplink-side dynamic transmission bandwidth, a column of a downlink-side dynamic transmission bandwidth BdD, a column of a label BdDBN corresponding to the bottleneck link causing the downlink-side dynamic transmission bandwidth, and a label data column. The label data column includes labels La constituting the LP, uplink-side utilization ratios ρU of links corresponding to the labels, and downlink-side utilization ratios ρD of the links corresponding to the labels. Incidentally, although an example is described in which the priority has only two stages, in general, it can have N stages (N is a positive integer).

Next, a basic processing carried out in the LP management server to realize the basic mechanism shown in FIGS. 2A to 2C and FIGS. 3A and 3B will be described with reference to FIGS. 10 to 14. The LP management server 3 acquires data of the bandwidth for each link and registers it into the link data table (FIG. 8) (step S1). The data may be automatically acquired from nodes in the network, or data input by an administrator may be acquired. Next, the LP management server 3 calculates the static transmission bandwidth for each LP on the basis of LP definition, which is separately held, and specifies an LP group LPGsm between edge routers (that is, between a source node and a destination node) on the basis of the calculated static transmission bandwidth (step S3).

The static transmission bandwidth for each LP will be described with reference to FIG. 11A. In FIG. 11A, the bandwidth of a label (specifically, the corresponding link) is represented by the length of an upper-side bar in uplink, and is represented by the length of a lower-side bar in downlink. In an example of FIG. 11A, a label L2 has the largest bandwidth, and a label L4 has the smallest bandwidth. Because the static transmission bandwidth of the entire LP is generally restricted by the link having the smallest bandwidth, the bandwidth of the label L4 is set to the static transmission bandwidth of the LP in FIG. 11A. Incidentally, there is a case in which bandwidths are different from each other in uplink and downlink. In such a case, the static transmission bandwidths of the LP may be different from each other in downlink and uplink. Labels corresponding to the bottleneck links may differ from each other in downlink and uplink. In this way, the n LPs (n=3 in FIG. 9) having one of the n top-ranked static transmission bandwidth between specific edge routers are selected to constitute the LP group LPGsm. Therefore, by limiting targets whose dynamic transmission bandwidth should be calculated based on the static transmission bandwidth, it is possible to reduce the amount of calculation. Data for LPs included in each LP group LPGsm (for example, the calculated static transmission bandwidth, labels constituting the LP, and a virtual label, if necessary) is stored in the LP table (FIG. 9).

Next, the LP management server obtains data concerning the utilization ratios of links from each router, and then stores the data into the link data table (FIG. 8) and the LP table (FIG. 9) (step S5). As described above, the utilization ratio of a link is acquired for each priority level. Then, it calculates the dynamic transmission bandwidths of LPs in each LP group LPGsm, and stores the calculation results into the LP table (FIG. 9) (step S7). The dynamic transmission bandwidth will be described with reference to FIGS. 11A and 11B. In examples of FIGS. 11A and 11B, a hatched portion in each bar indicating the static transmission bandwidth of the label shows a used bandwidth. In actual communication, portions other than the bandwidth used in the static bandwidth of each label are used. That is, in FIGS. 11A and 11B, the length of a white portion in the bar indicates an available bandwidth. In FIG. 11A, both white portions in both the uplink bar of the label L4 and the downlink bar of the label L4 have the shortest length in uplink and downlink, and the dynamic transmission bandwidth of the LP is specified by the smallest uplink bandwidth a and the smallest downlink bandwidth b of the label L4. However, it is not necessary that the same label have the smallest bandwidth in uplink and downlink. In addition, the utilization ratio of each label depends on time. For example, the state shown in FIG. 11A is changed to the state shown in FIG. 11B with the passage of time. Here, the uplink used bandwidth of the label L3 becomes large, and the downlink used bandwidth of the label L2 becomes large. Therefore, the dynamic transmission bandwidth is specified by the smallest bandwidth c of the label L3 in uplink, and is specified by the smallest bandwidth d of the label L2 in downlink.

The dynamic transmission bandwidth is calculated by the following method, specifically. As shown in FIG. 12, in a relay node j, an input-side bandwidth, an input-side utilization ratio, an output-side bandwidth, an output-side utilization ratio, and an output-side dynamic bandwidth are respectively denoted by letters $B_{ij}$, $\rho_{ij}$, $B_{oj}$, $\rho_{oj}$, and $B_j$. In this embodiment, the dynamic bandwidth $B_j$ is calculated by using a queue model. When the packet side is variable, $B_j = B_{oj}(1-\rho_{oj})$ is calculated according to an M/M/1 model. In addition, when the packet side is fixed, $B_j = B_{oj}(1-\rho_{oj})(1-\rho_{oj}^2/2)$ is calculated according to an M/D/1 model. When a priority class is defined, the dynamic bandwidth is approximately calculated by replacing the utilization ratio $\rho_{oj}$ of each priority class with the utilization ratio totaled for classes higher than the priority class. A dynamic transmission bandwidth B of LP is calculated to be equal to Min{$B_j$} by the dynamic bandwidths $B_j$ for all links constituting the LP.

A supplementary explanation for the queue model will be carried out below. Here, the queue model shown in FIG. 13 is assumed. That is, the queue model includes an element 104 currently being serviced, elements 102 and 103 in a queue, and a latest reached element 101. In this case, it is assumed that a queue length between the elements 102 and 103 is "Lq". It is also assumed that, in a case where the queue length of the element 102 is "Lq", the time to forward a packet having a size P (bit) is "Wq". In addition, it is assumed that the queue length of the element 104 currently being serviced is "$\rho$", the queue length of the latest reached element 101 is "1", and the sum (Lq+$\rho$) of the queue length Lq and the queue length $\rho$ of the element 104 currently being serviced is "L". It is also assumed that, in a case where the length (Lq+$\rho$) is "L", the time to forward a packet having a size P (bit) is "W", and a queue length "L+1" including the queue length of the latest reached element 101 is "Lr". In this case, it is assumed that waiting time is "Wr".

Then, in a case where the M/M/1 model in which the size of a packet is not fixed is used, the following expressions are established: Lq=$\rho^2/(1-\rho)$; L=$\rho/(1-\rho)$; and Lr=$1/(1-\rho)$. Incidentally, because an input buffer is actually finite, an M/M/1{N} model (N is the length of a buffer) is preferable. However, the buffer can have a large length, and thus the M/M/1 model is sufficient in this embodiment.

Therefore, the following expression is established:

$$Wr=(P/B')\times Lr=(P/B')/(1-\rho)=P/B'' \qquad (1),$$

where B' represents a static bandwidth (bps), and B" represents a dynamic bandwidth.

By modifying the expression (1), the following expressions are obtained:

$$(1/B')/(1-\rho)=1/B'', \text{ and}$$

$$B''=B'\times(1-\rho).$$

As described above, the dynamic transmission bandwidth is equal to the remaining bandwidth obtained by subtracting a used bandwidth from the static bandwidth.

Further, in a case where the M/D/1 model in which the size of a packet is fixed is used, the following expressions are established: Lq'=$1/2\times\rho^2/(1-\rho)$; L'=$(\rho-1/2\times\rho^2)/(1-\rho)$; and Lr'=$(1-1/2\times\rho^2)/(1-\rho)$.

Then, the following expression is obtained:

$$Wr=(P/B')\times Lr=(P/B')\times(1-\rho^2/2)/(1-\rho)=P/B'' \qquad (2).$$

By modifying the expression (2), the following expressions are obtained:

$$(1/B)\times(1-\rho^2/2)/(1-\rho)=1/B'', \text{ and}$$

$$B''=B'\times(1-\rho)/(1\rho^2/2).$$

As described above, the dynamic transmission bandwidth in the case in which the size of a packet is fixed is wider than that in the case in which the size of a packet is not fixed. Because the size of a packet is equal to or smaller than 1500 bytes, the actual dynamic transmission bandwidth has a mean value of bandwidths in the case where the size of the packet is fixed and in the case where the size of the packet is not fixed.

Figure 10:
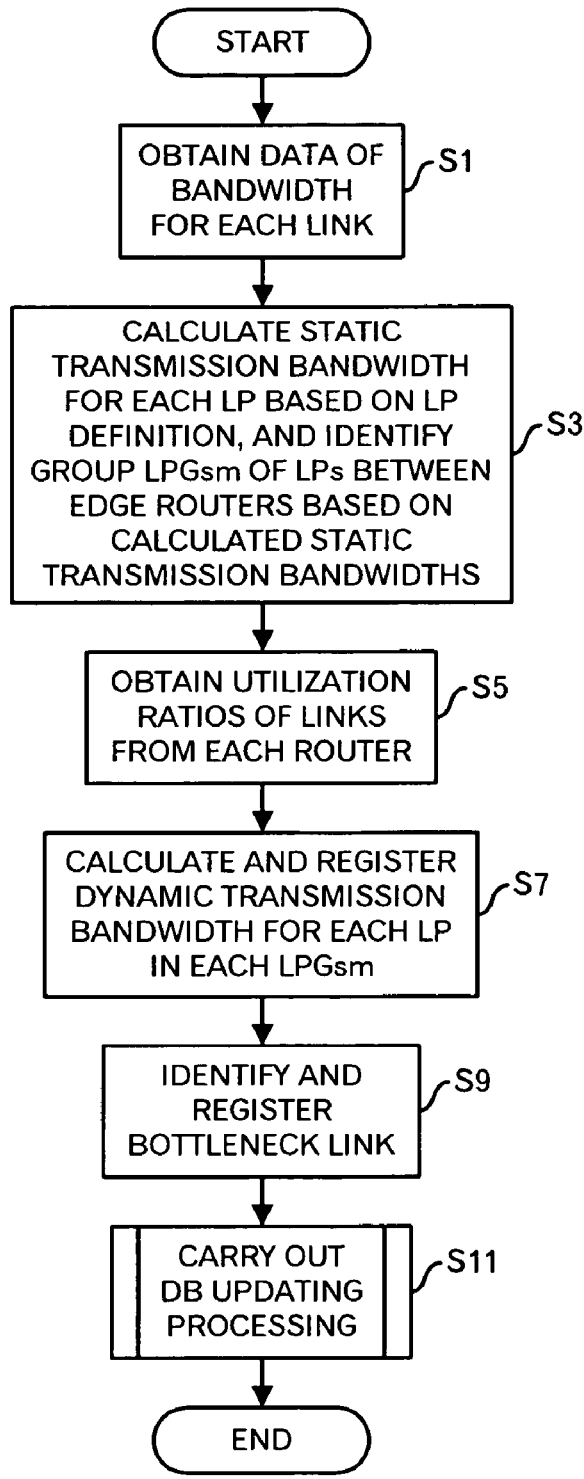
FIG. 10 is a diagram showing a processing flow of a basic processing in the LP management server.

Returning to the explanation of FIG. 10, because the dynamic transmission bandwidth B=Min{$B_{oj}$} is calculated at the step S7, the LP management server 3 identifies a bottleneck link causing $B_j$ that limits the dynamic transmission bandwidth B, and registers the bottleneck link into the LP table (FIG. 9) (step S9). Incidentally, a bottleneck link causing the bandwidth that limits the statistic transmission bandwidth is similarly identified and is then registered into the LP table (FIG. 9). Subsequently, it carries out a DB updating processing on the LP-DB 31 (step S11).

The DB updating processing will be described with reference to FIG. 14. First, the LP management server 3 transmits an intensive monitoring instruction to a router corresponding to the static bottleneck link BNL (step S221). For example, data concerning a router, which monitors each link, is separately stored, and the router is identified, on the basis of such data, by using the static bottleneck link identified in the step S9. In addition, the utilization ratio-measuring unit 51 of the router that received the intensive monitoring instruction more frequently monitors the static bottleneck link and/or changes a threshold value used to judge whether or not a utilization ratio updating notice is transmitted. Further, it transmits the intensive monitoring instruction to a router corresponding to the dynamic bottleneck link BNL (step S223). Then, the similar processing as that in the step S221 is carried out in the router. In a case where the static bottleneck link and the dynamic bottleneck link are the same, the step S223 may be skipped.

Thereafter, the LP management server 3 waits the utilization ratio updating notice from each node in the network 1 (step S225). Then, in a case where the utilization ratio updating notice is received from any router, it registers data of the utilization ratio into the link data table (FIG. 8) and the LP table (FIG. 9), and calculates the dynamic transmission bandwidth of an LP associated with the link whose utilization ratio is updated and registers the calculated dynamic transmission bandwidth into the LP table (FIG. 9) (step S227). The calculation of the dynamic transmission bandwidth is the same as that carried out in the step S7 of FIG. 10, and thus a description thereof will be omitted. In the step S227, because it can be found out which label (i.e. link) in an LP is the bottleneck link BNL, it identifies the label of the bottleneck link (step S229). Then, it determines whether the bottleneck link registered in the LP table (FIG. 9) and the bottleneck link lately identified are identical to each other, that is, whether the bottleneck link is shifted (step S231). When the bottleneck link is not shifted, the processing returns to the step S225.

On the other hand, in a case where it is determined that the bottleneck link was shifted, the LP management server 3 registers the label of the bottleneck link identified in the step S229 into the LP table (FIG. 9) (step S232). In addition, it transmits the intensive monitoring instruction to a router corresponding to the shifted bottleneck link (step S233). The same processing as that carried out in the step S223 is carried out. In addition, it determines whether or not the preceding bottleneck link is a static bottleneck link, by referring to the LP table (FIG. 9). In a case where the preceding bottleneck link is not a static bottleneck link, it transmits an intensive monitoring cancellation notice to a router corresponding to the preceding bottleneck link (step S235). The router that received the intensive monitoring cancellation notice returns utilization ratio measurement conditions to their original states. That is, the router returns a measurement period to a default value, and the threshold value used to judge whether or not the utilization ratio updating notice is transmitted, to its original value.

The steps S225 to S235 are repeatedly carried out until conditions required to terminate a processing, such as the reception of an explicit processing terminating instruction, are satisfied (step S237).

Figure 14:
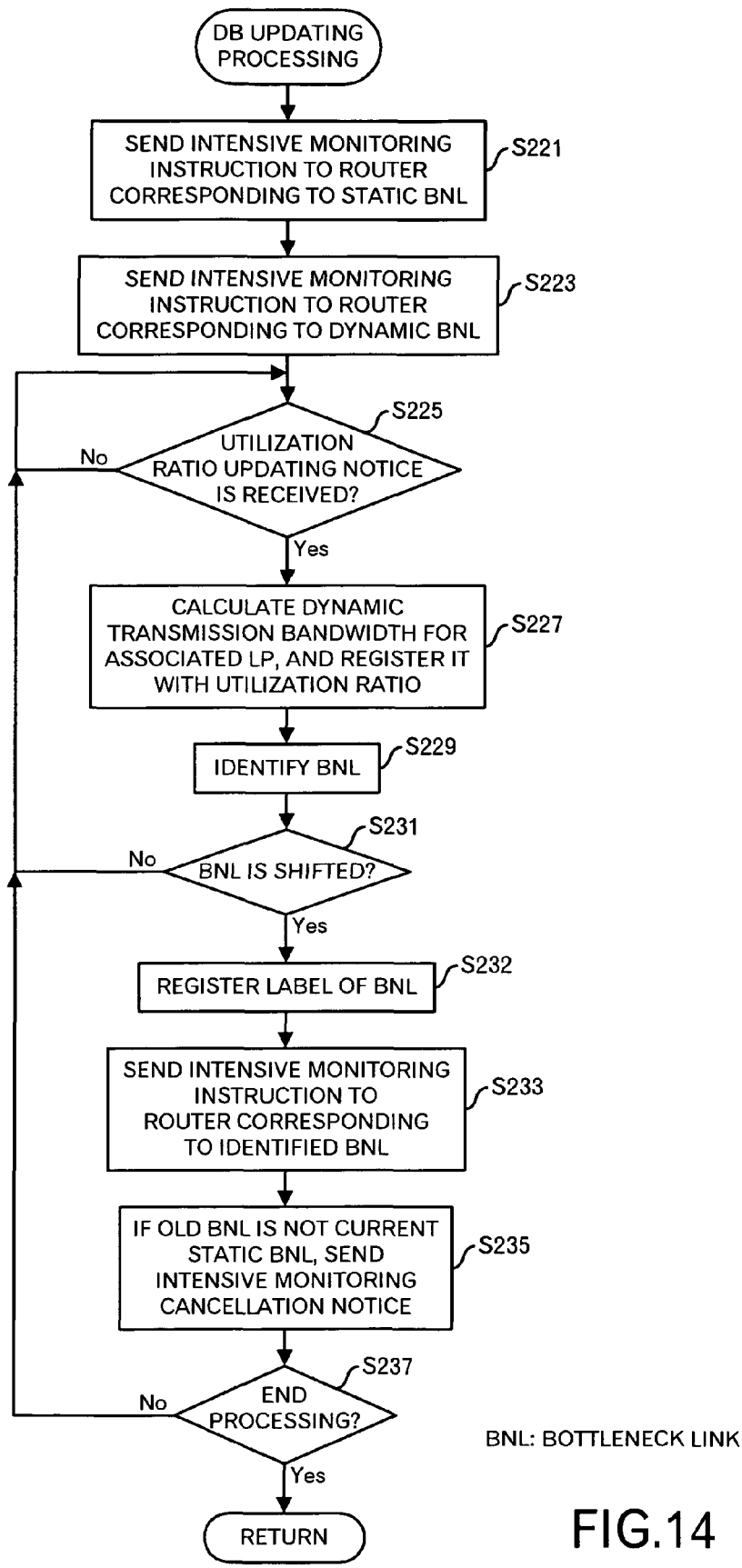
FIG. 14 is a diagram showing a processing flow of a DB update processing.
Figure 15:
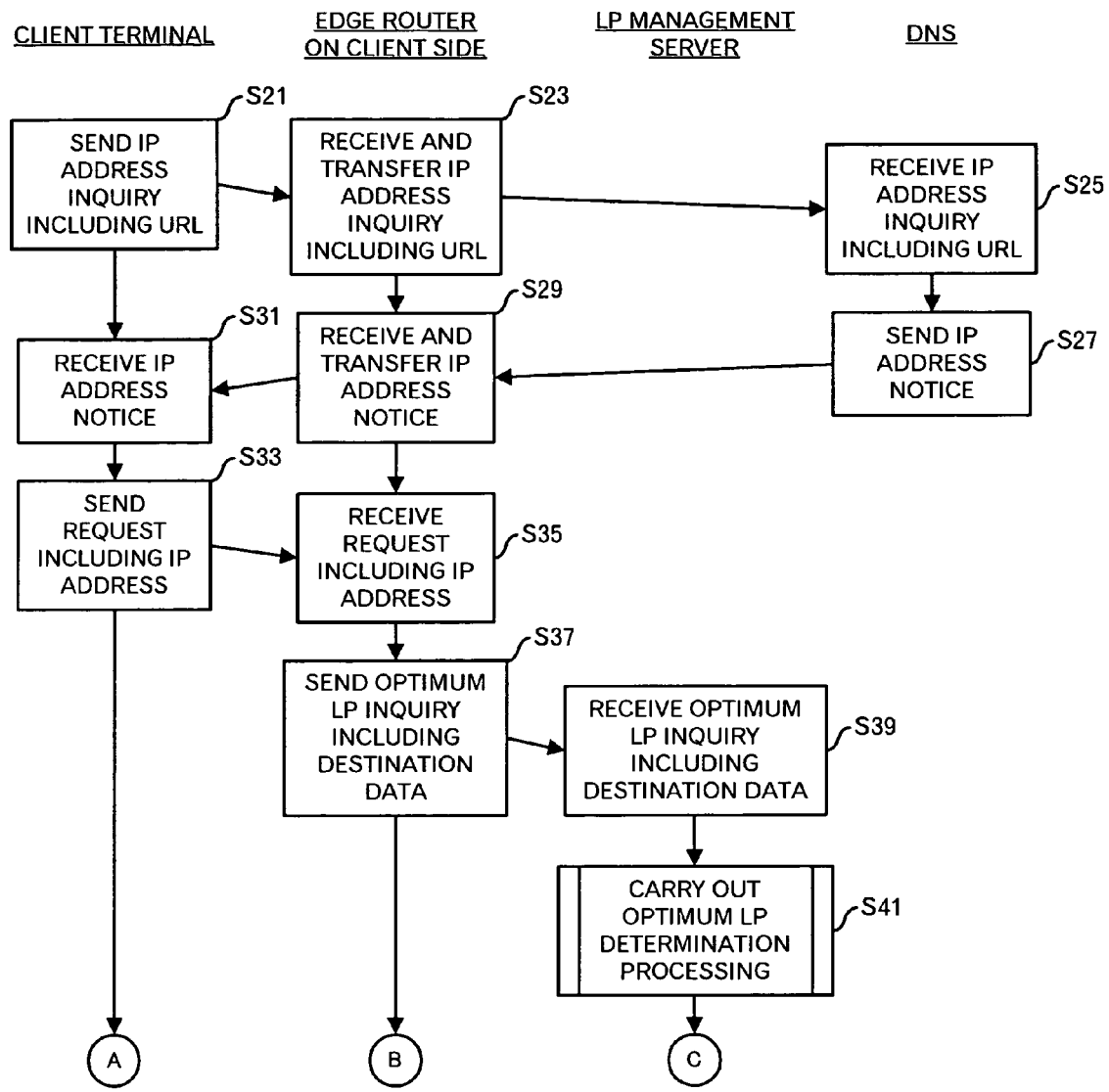
FIG. 15 is a diagram showing a processing flow (a first portion) to carry out routing along with the optimum LP.

By carrying out the processing shown in FIG. 14, it becomes possible to intensively monitor a bottleneck link having much influence on the performance of a network and thus to reduce unnecessary monitoring overhead. Accordingly, it becomes possible to effectively update the LP table (FIG. 9). In addition, the routing can be carried out in considering the state of a network. Incidentally, it is possible to configure the router to notify the current transmission bandwidth to all relevant routers to make each router determine whether the router itself corresponds to a bottleneck link and to notify the determination result to the LP management server.

Next, based on the aforementioned basic processing in the embodiment, a processing when actual packet routing is carried out will be explained. Incidentally, first, a processing in a normal routing in which the number of destination servers of the packet is one will be explained with reference to FIGS. 15 to 19.

Firstly, an IP address inquiry including a Uniform Resource Locator (URL) is transmitted to a DNS from, for example, a Web browser of a client terminal (step S21). Then, an edge router on the client side receives the IP address inquiry including the URL from the client terminal, and transfers it to the DNS (step S23). Because the communication between the edge router on the client side and the DNS frequently occurs, the edge router on the client side stores data of LP and RLP designated in advance by the LP management server 3 (including the first label of LP, and the first label of RLP, and if necessary, the virtual label. Incidentally, this data is updated at an arbitrary timing.), and carries out the transfer by using the data of LP and RLP. When DNS receives the IP address inquiry including the URL from the edge router on the client side (step S25), the DNS extracts an IP address corresponding to the URL by the search, and replies an IP address notice to the edge router on the client side (step S27). At the reply, by the data of RLP (including the first label, and if necessary, the virtual label), the route is identified. The edge router on the client side receives the IP address notice from the DNS, and transfers it to the client terminal of the requesting source (step S29). The Web browser of the client terminal or the like receives the IP address notice from the edge router on the client side (step S31). Then, the Web browser transmits a request including the received IP address (step S33). For example, in case of Hyper Text Transfer Protocol (HTTP), a GET message is transmitted. When the edge router on the client side receives the request including the IP address from the client terminal, the edge router on the client side stores data of the request into a storage device such as a buffer (step S35), and transmits an optimum LP inquiry including destination data such as the IP address and a port number to the LP management server 3 (step S37). Because the communication between the edge router on the client terminal and the LP management server 3 frequently occurs, the edge router on the client server holds data of LP and RLP designated in advance by the LP management server 3, and carries out the transfer by using the data of LP and RLP.

When the LP management server 3 receives the optimum LP inquiry including the destination data such as the IP address and the port number from the edge router on the client terminal (step S39), and carries out an optimum LP determination processing (step S41). The optimum LP determination processing will be explained with reference to FIGS. 16 and 17. The LP management server 3 refers to the LP table to identify nodes at both ends from IP addresses of the inquiry source and destination and extract the corresponding LPs (step S50). In addition, it determines a routing policy from the port number included in the destination data and the like (step S51) Here, the identified routing policy is any of asymmetric routing, symmetric routing in which the traffic amount is uniform in both uplink and downlink, and symmetric routing in which the traffic amount is ununiform (in a case where the traffic amounts in uplink and downlink are different twice or more, for example). For example, when the routings in uplink and downlink are not necessarily symmetric, the asymmetric routing is determined. For example, when an application such as IP telephoning, file download, file upload and web browsing can be identified from the IP address and the port number, the symmetric routing is selected. When it is IP telephoning, the symmetric routing in which the traffic amount is uniform is selected, and when it is the file download, file upload or web browsing, the symmetric routing in which the traffic amount is ununiform is selected.

Therefore, when the asymmetric routing is selected (step S53: No route), the LP management server 3 refers to the LP table shown in FIG. 9 to select LPs having the maximum dynamic bandwidth in each of uplink and downlink (step S55). Then, the processing returns to the calling source.

On the other hand, when the symmetric routing is selected (step S53: Yes route), and the traffic amount is uniform (step S57: Yes route), the LP management server 3 excludes LP(s) whose value of the dynamic transmission bandwidth in a direction the traffic amount is lesser out of uplink and downlink is equal to or less than a prescribed value from the LP group extracted at the step S50 (step S59). Incidentally, when there is no remaining LP, the processing may shift to the step S55. Then, the LP management server 3 selects an LP in which the difference between the dynamic transmission bandwidths in uplink and downlink is least among the remaining LPs (step S61). Instead of the step S61, an LP in which an average value of the dynamic transmission bandwidths in uplink and downlink is largest may be selected among the remaining LPs. Then, the processing returns to the calling source.

Furthermore, when the symmetric routing is selected (step S53: Yes route) and the traffic amount is ununiform in uplink and downlink (step S57: No route), the LP management server 3 excludes LP(s) in which the value of the dynamic transmission bandwidth in a direction the traffic amount is lesser (uplink or downlink) is equal to or less than a prescribed value from the LP group extracted at the step S50 (step S63). Incidentally, when there is no remaining LP, the processing may shift to the step S55. Then, the LP management server 3 selects an LP having the maximum dynamic transmission bandwidth in a direction the traffic amount is larger (uplink or downlink) from the remaining LPs (step S65). Then, the processing returns to the calling source.

By carrying out such a processing, according to the routing policy identified by a communication application or the like, the optimum LP is selected.

A processing flow of FIG. 16 will be specifically explained with reference to FIGS. 17A to 17D. As shown in FIG. 17A, it is assumed that the static transmission bandwidth (Bs) of LP#1 is 100, the dynamic transmission bandwidth (BdU) of LP#1 in uplink is 40, the dynamic transmission bandwidth (BdD) of LP#1 in downlink is 3, the static transmission bandwidth (Bs) of LP#2 is 80, the dynamic transmission bandwidth (BdU) of LP#2 in uplink is 30, the dynamic transmission bandwidth (BdD) of LP#2 in downlink is 10, the static transmission bandwidth (Bs) of LP#3 is 50, the dynamic transmission bandwidth (BdU) of LP#3 in uplink is 20, and the dynamic transmission bandwidth (BdD) of LP#3 in downlink is 30. When the asymmetric routing is selected, as shown in FIG. 17B, the dynamic transmission bandwidth of LP#1 is largest with respect to uplink, the dynamic transmission bandwidth of LP#3 is largest with respect to downlink. Accordingly, LP#1 for uplink and LP#3 for downlink are respectively selected. On the other hand, as shown in FIG. 17C, when the symmetric routing in which the traffic amount is ununiform in uplink and downlink is selected, specifically, when the traffic amount in uplink is larger than the traffic amount in downlink, LP#1 is excluded at the step S63, because the dynamic transmission bandwidth in "downlink" is equal to or less than the prescribed value, and LP#2 is selected at the step S65, because the dynamic transmission bandwidth in uplink is largest. Furthermore, as shown in FIG. 17D, when the symmetric routing in which the traffic amount is uniform is selected, the LP#1 is excluded at the step S59, because the dynamic transmission bandwidth in downlink is least, and LP#3 is selected at the step S61, because the difference between the dynamic transmission bandwidths in uplink and downlink is least.

Figure 16:
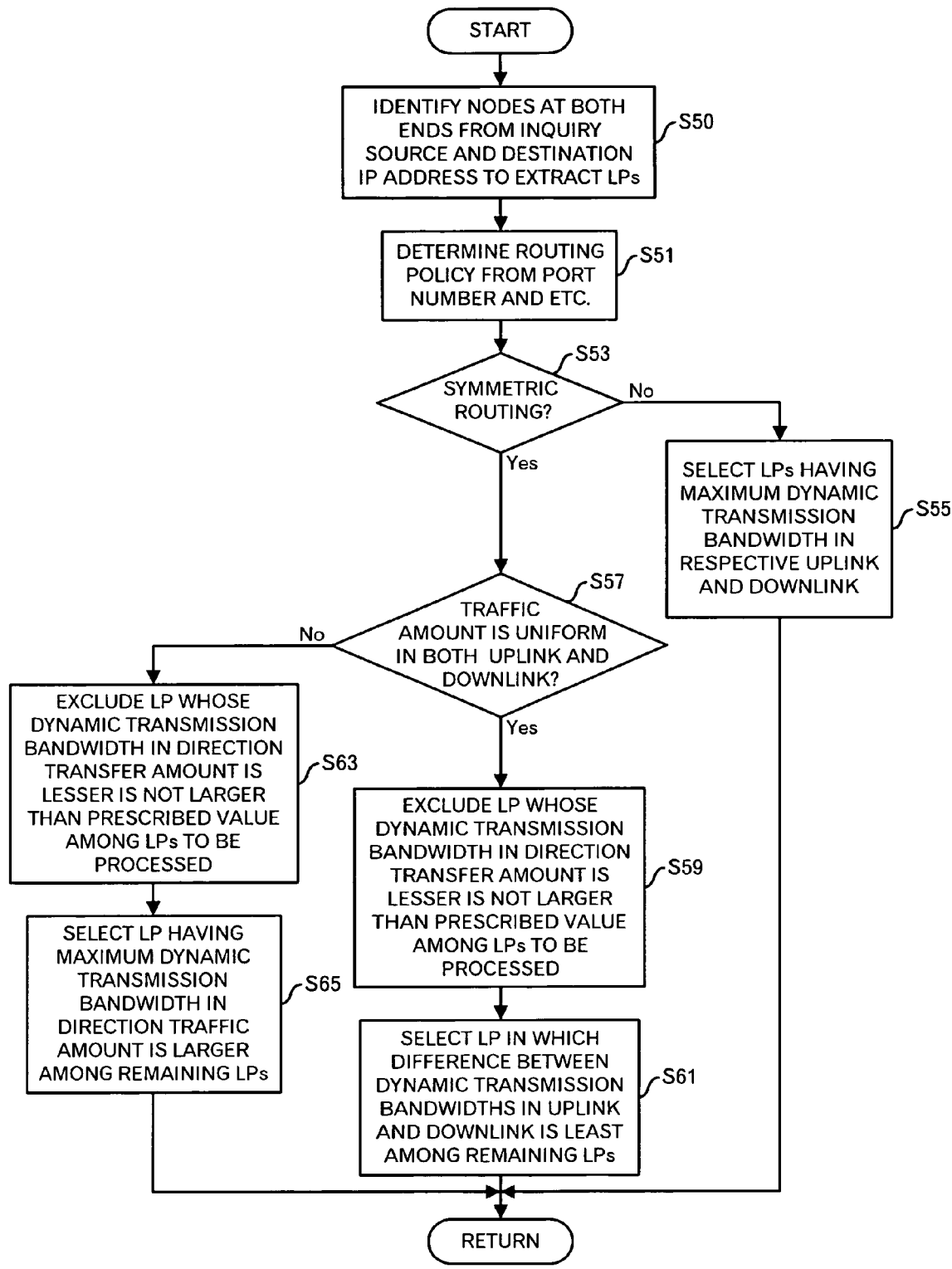
FIG. 16 is a diagram showing a processing flow of an optimum LP determination processing.
Figure 17:
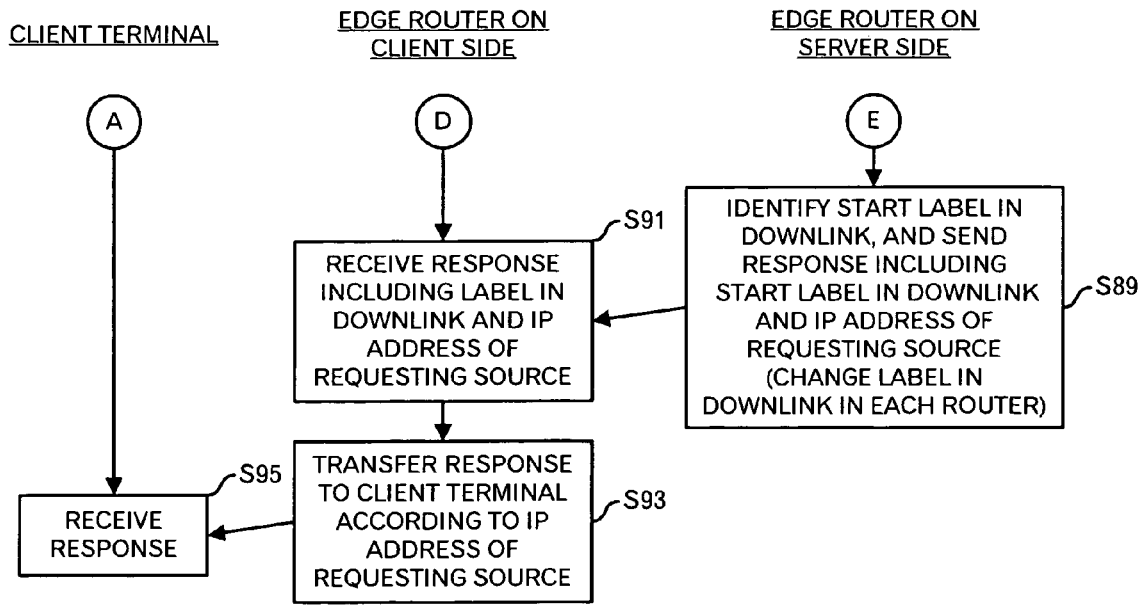
FIGS. 17A to 17D are diagram showing a specific example of the optimum LP determination processing.
Figure 18:
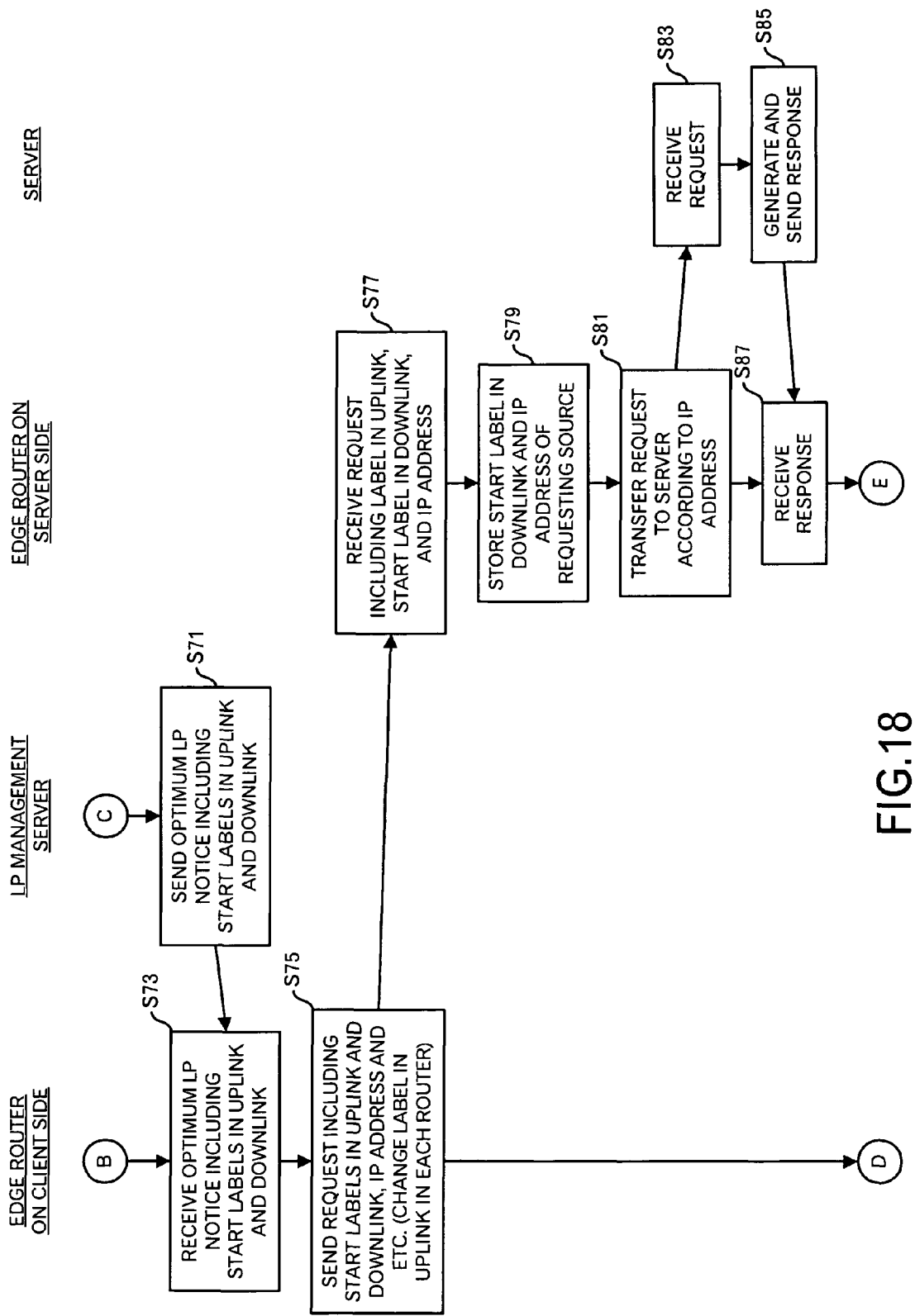
FIG. 18 is a diagram showing a processing flow (a second portion) to carry out routing along with the optimum LP.
Figure 20:
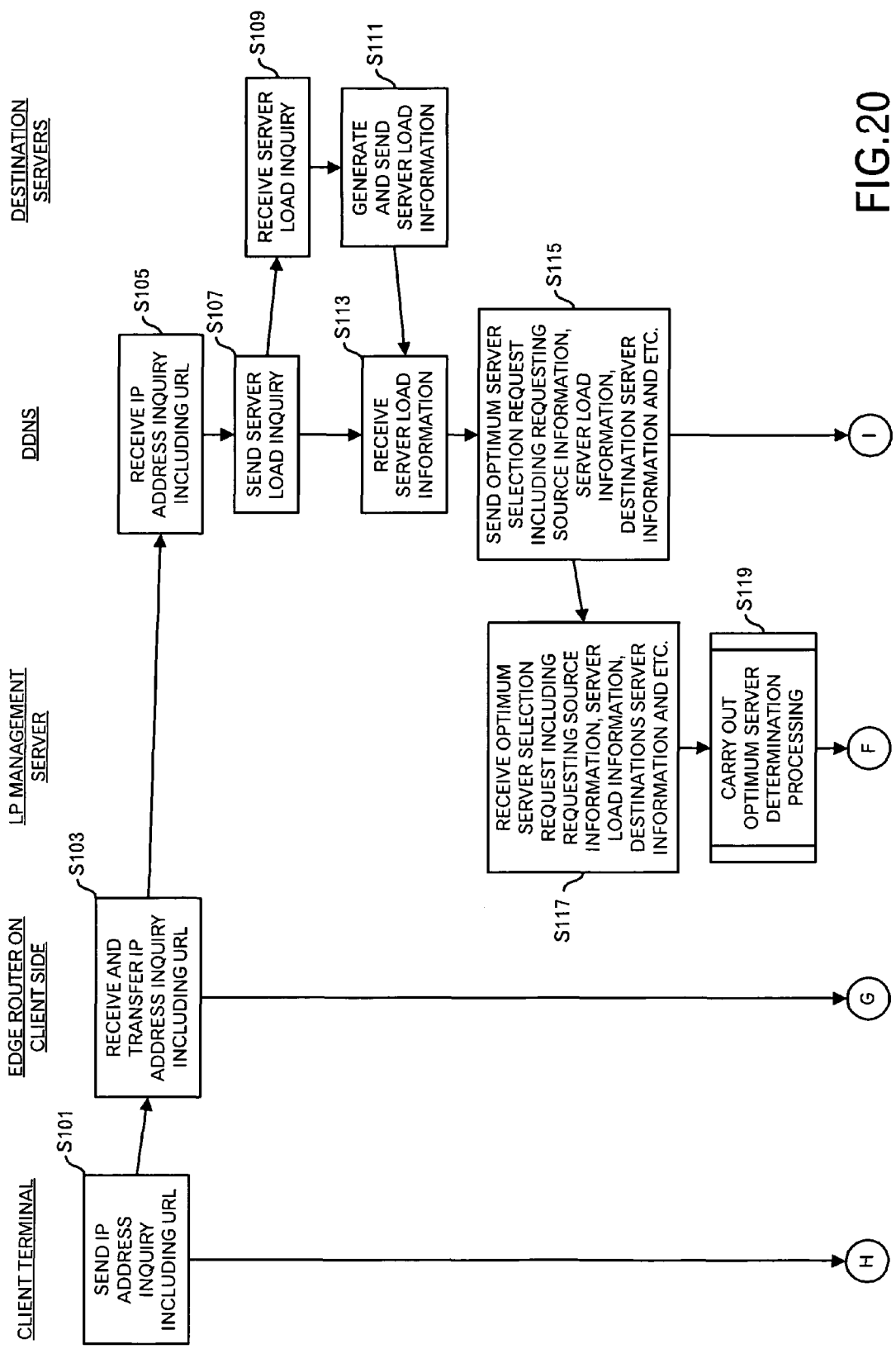
FIG. 20 is a diagram showing a processing flow (a first portion) of a wide area routing.
Figure 21:
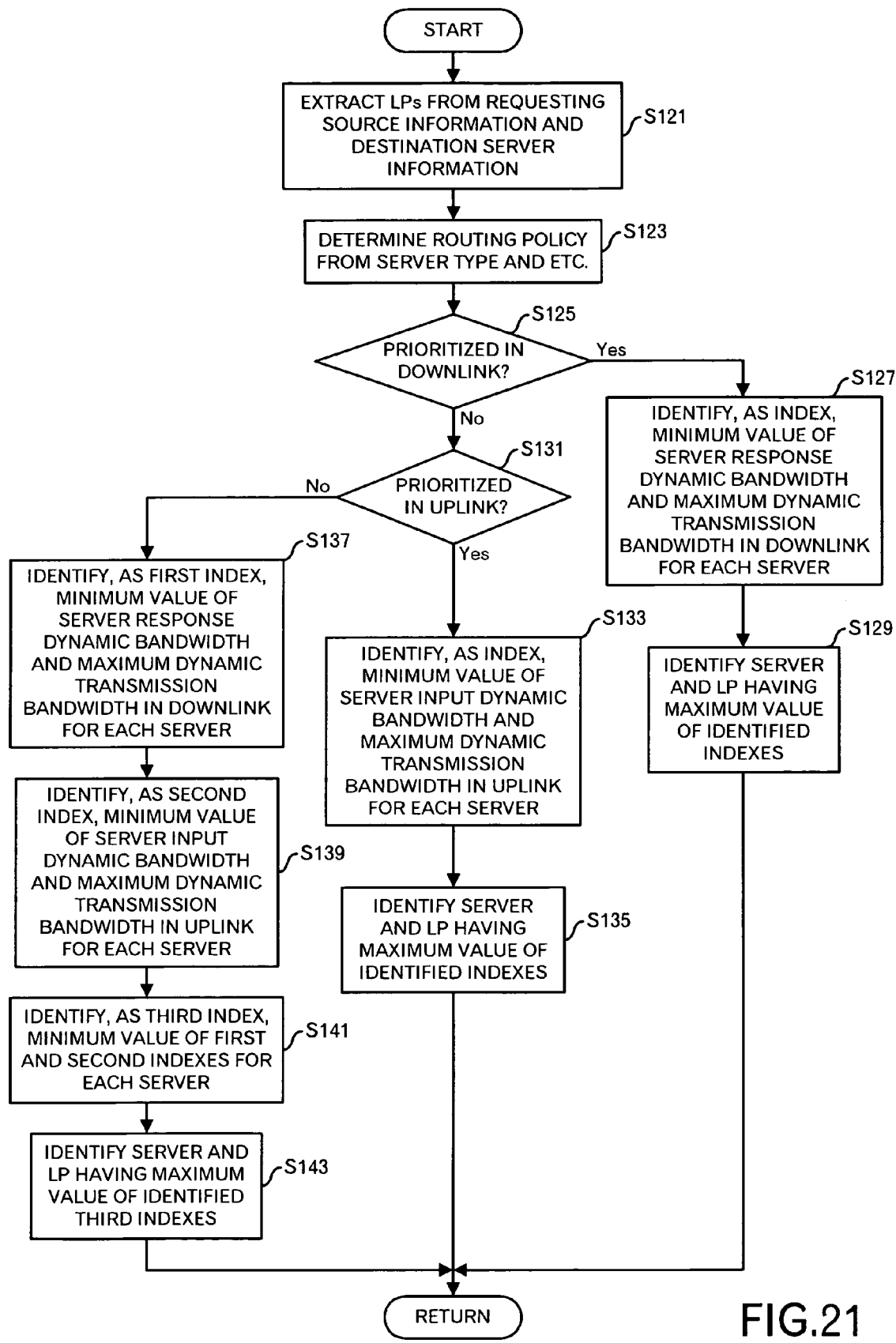
FIG. 21 is a diagram showing a processing flow of an optimum server determination processing.

Although the processing returns to the processing in FIG. 16, the processing shifts to a processing in FIG. 18 through terminals B and C. Incidentally, a processing of the client terminal shifts to a processing in FIG. 19 through a terminal A. First, in FIG. 18, the LP management server 3 transmits an optimum LP notice including a start labels in uplink and downlink (if the virtual label is necessary for LP in downlink, the virtual label is also included. The same is applied to the following.) which are identified by using the LP table shown in FIG. 9 from the LP(s) determined at the step S41, to the edge router on the client side (step S71). The edge router on the client side receives the optimum LP notice including the start labels in uplink and downlink from the LP management server 3 (step S73), modifies the request received at the step S35 to include the start labels in uplink and downlink, and transmits the request including the start labels in uplink and downlink, an IP address of the destination server and the like to the destination server (step S75). Incidentally, the edge router on the client side identifies a link of a transmission destination by referring to the link table by the start label in uplink. The next router identifies the next label by referring to the label table by the start label in uplink, and identifies a link of the transmission destination by referring to the link table by the identified next label. Then, the start label in uplink included in the received request is replaced with the next label to further transmit the request to a further next router. By repeating this processing, the request reaches the edge router on the server side.

The edge router on the server side receives the request including the start label in downlink and an IP address of the destination server (step S77), and stores the start label in downlink and the IP address of the requesting source into a storage device such as a main memory (step S79). Then, the edge router on the server side identifies the transmission destination of the request by the IP address of the destination server, and transfers the request to the destination server (step S81).

The destination server receives the request from the edge router on the server side (step S83), carries out a predetermined processing, and generates and transmits a response to the edge router on the server side (step S85). The edge router on the server side receives the response from the destination server (step S87). The processing shifts to a processing in FIG. 19 through terminals D and E.

The edge router on the server side identifies the start label in downlink, which was stored at the step S79, generate a response including the start label and the IP address of the requesting source, and transmits the response according to the start label (step S89). The edge router on the server side identifies a link of the transmission destination by referring to the link table by the start label in downlink. The next router identifies the next label by referring to the label table by the start label in downlink, and further identifies the link of the transmission destination by referring to the link table by the next label. Then, the next router replaces the start label in downlink in the received response with the next label, and transmits the modified response to the further next router. By repeating such a processing, the packet reaches the edge router on the client side. The edge router on the client side receives a response including the label in downlink and the IP address of the requesting source (step S91), and transfers the response to the client terminal according to the IP address of the requesting source (step S93). The client terminal receives the response from the edge router on the client side, and displays it on the display device by, for example, the Web browser (step S95).

By carrying out such a processing, according to the optimum LP determined by the LP management server 3, the communication between the client terminal and the destination server is carried out. Accordingly, the efficient communication is carried out also in the entire network.

In the example described above, although one destination server can be identified, there is a case where the servers that carry out the same processing are distributedly located in a wide area. The processing in such a case will be explained with reference to FIGS. 20 to 24.

First, for example, the Web browser of the client terminal transmits an IP address inquiry including a URL to the DDNS (step S101). Then, the edge router on the client side receives the IP address inquiry including the URL from the client terminal, and transfers the IP address inquiry to the DDNS (step S103). Because the communication between the edge router on the client side and the DDNS frequently occurs, data of LP and RLP designated in advance by the LP management server 3 (the first label of LP and the first label of RLP and if necessary, the virtual label. Incidentally, this data is updated at an arbitrary timing.) is held on the edge router on the client side, and by using the data of LP and RLP, the transfer is carried out. When the DDNS receives the IP address inquiry including the URL from the edge router on the client side (step S105), the DDNS extracts IP address candidates corresponding to the URL, and transmits a server load inquiry to each of the IP address candidates (step S107). The IP address candidates are IP addresses of the destination servers. When each of the destination servers receives the server load inquiry from the DDNS (step S109), it generates server load information and replies the server load information to the DDNS (step S111). The DDNS receives the server load information from each of the destination servers, and stores the received information into a storage device such as a main memory (step S113).

Then, the DDNS transmits an optimum server selection request including requesting source information (for example, an IP address of the client terminal, or an address/identification information (ID) of the edge router of the requesting source), the server load information, information of the destination server (IP address and server type information) and the like to the LP management server 3 (step S115). The LP management server 3 receives the optimum server selection request including the requesting source information, the server load information, the information of the destination server and the like (step S117), and carries out an optimum server determination processing (step S119). This optimum server determination processing will be explained with reference to FIGS. 21 and 22.

First, the LP management server 3 identifies edge routers at both ends based on the requesting source information (for example, the address of the edge router of the requesting source or the like) and the information of the destination server (IP address or the like), and refers to the LP table shown in FIG. 9 to identify LPs from the edge routers at both ends (step S121). Here, it is assumed that LPs are extracted for each destination server.

After that, the LP management server 3 determines a routing policy based on a server type included in the information of the destination server and the like (step S123). For example, when the destination server has a server type of the Web server, or a server type of the download server, the routing policy is determined as "prioritized in downlink". In addition, when the destination server has a server type of the upload server, the routing policy is determined as "prioritized in uplink". Furthermore, when the destination server has a server type indicating the server for an online data processing, the routing policy is determined as "prioritized in uplink and downlink".

Therefore, when the routing policy indicates "prioritized in downlink" (step S125: Yes route), the LP management server 3 identifies, as an index, the minimum value of the server response dynamic bandwidth To included in the server load information and the maximum dynamic transmission bandwidth BdDb in downlink relating to LPs with respect to the server being processed for each server (step S127). For example, in an example of FIG. 22A, three servers of servers S1, S2 and S3 are already extracted as candidates, and the server response dynamic bandwidth To for each server, and the maximum dynamic transmission bandwidth BdDb in downlink in LPs corresponding to each server are enumerated. Then, lesser one of the server response dynamic bandwidth To and the maximum dynamic transmission bandwidth BdDb in downlink is determined as an index. In an example of FIG. 22A, as for the server S1, 30 is determined as an index, out of 80 and 30. In addition, as for the server S2, 50 is determined as an index, out of 60 and 50. Furthermore, as for the server S3, 40 is determined as an index, out of 40 and 50. Next, the LP management server 3 identifies a server having the maximum value of the identified indexes, and an LP having the maximum dynamic transmission bandwidth BdDb in downlink (step S129). Then, the processing returns to the calling source.

On the other hand, when the routing policy indicates "prioritized in uplink" (step S125: No route, and step S131: Yes route), the LP management server 3 identifies, as an index, the minimum value of the server input dynamic bandwidth Ti included in the server load information and the maximum dynamic transmission bandwidth BdUb in uplink relating to LPs with respect to the server to be processed for each server (step S133). For example, in an example of FIG. 22B, the three servers of servers S1, S2 and S3 are already extracted as candidates, and the server input dynamic bandwidth Ti for each server and the maximum dynamic transmission bandwidth BdUb in uplink in LPs corresponding to each server are enumerated. Then, lesser one of the server input dynamic bandwidth Ti and the maximum dynamic transmission bandwidth BdUb in uplink are determined as an index. In an example of FIG. 22B, as for the server S1, 50 is determined as an index, out of 60 and 50. In addition, as for the server S2, 40 is determined as an index, out of 40 and 60. Furthermore, as for the server S3, 20 is determined as an index, out of 20 and 40. Next, the LP management server 3 identifies the server having the maximum value among the identified indexes, and an LP having the maximum dynamic transmission bandwidth BdUb in uplink (step S135). Then, the processing returns to the calling source.

Furthermore, when the routing policy indicates "prioritized in uplink and downlink" (step S125:No route and step S131:No route), the LP management server 3 identifies, as a first index D1, the minimum value of the server response dynamic bandwidth To and the maximum dynamic transmission bandwidth BdDb in downlink relating to LPs with respect to the server being processed for each server (step S137). For example, in an example of FIG. 22C, the three servers of servers S1, S2 and S3 are already extracted as candidates, the server response dynamic bandwidth To for each server, and the maximum dynamic transmission bandwidth BdDb in downlink in LPs corresponding to each server are enumerated. Then, lesser one of the server response dynamic bandwidth To and the maximum dynamic transmission bandwidth BdDb in downlink is determined as a first index D1. In an example FIG. 22C, as for the server S1, 30 is determined as the first index D1, out of 120 and 30. In addition, as for the server S2, 50 is determined as the first index D1, out of 80 and 50. Furthermore, as for the server S3, 40 is determined as the first index D1, out of 40 and 50.

In addition, the LP management server 3 identifies, as a second index U1, the minimum value of the server input dynamic bandwidth Ti and the maximum dynamic transmission bandwidth BdUb in uplink relating to LPs with respect to the server being processed for each server (step S139). For example, in an example of FIG. 22C, the server input dynamic bandwidth Ti for each server and the maximum dynamic transmission bandwidth BdUb in uplink in LPs corresponding to each server are enumerated. Then, lesser one of the server input dynamic bandwidth Ti and the maximum dynamic transmission bandwidth BdUb in uplink is determined as the second index U1. In an example of FIG. 22C, as for the server S1, 50 is determined as the second index U1, out of 60 and 50. In addition, as for the server S2, 40 is determined as the second index U1, out of 40 ad 60. Furthermore, as for the server S3, 20 is determined as the second index U1, out of 20 and 40.

Then, the LP management server 3 identifies, as a third index, the minimum value of the first index D1 and the second index U1 for each server (step S141). In an example of FIG. 22C, as for the server S1, 30 is determined as the third index, out of 30 and 50, and as for the server S2, 40 is determined as the third index, out of 50 and 40, and as for the server S3, 20 is determined as the third index, out of 40 and 20.

Finally, the LP management server 3 identifies a server having the maximum value of the identified third indexes, an LP having the maximum dynamic transmission bandwidth BdUb in uplink and an LP having the maximum dynamic transmission bandwidth BdDb in downlink (step S143). Then, the processing returns to the calling source.

By carrying out such a processing, while taking into account the server load, the optimum server and LP can be identified. Incidentally, the processing in FIG. 20 shifts to the processing in FIG. 23 through terminals F, G, H and I.

The LP management server 3 stores the IP address of the optimum server, start labels of LP in uplink and downlink and the like (if the virtual label is necessary for RLP, the virtual label is included. This is employed in the subsequent processing.) into a storage device such as a main memory (step S151). Here, for example, information of the requesting source (an IP address or identification information (ID) of an edge router of the requesting source) may be additionally stored. Then, the LP management server 3 replies the IP address of the optimum server to the DDNS (step S153). When the DDNS receives the IP address of the optimum server from the LP management server 3 (step S155), the DDNS transmits the IP address of the optimum server to the client terminal (step S157). When the edge router on the client side receives the IP address of the optimum server from the DDNS, the edge router on the client side transfers the IP address of the optimum server to the client terminal (step S159). When the client terminal receives, as a response from the DDNS, the IP address of the optimum server from the edge router on the client side (step S161), the client terminal transmits a request including the IP address of the optimum server to the optimum server (step S163).

The edge router on the client side receives the request including the IP address of the destination server (i.e. optimum server) from the client terminal (step S165), and stores the request into a storage device such as a buffer. Then, it transmits an optimum LP inquiry including the IP address of the destination server, and information of the requesting source (IP address of the client terminal, IP address of the edge router on the client side or the like) to the LP management server 3 (step S167). The LP management server 3 receives the optimum LP inquiry including the IP address of the destination server and the information of the requesting source from the edge router on the client side (step S169). The processing shifts to the processing in FIG. 24 through terminals K and L.

The LP management server 3 identifies the optimum LP corresponding to the IP address of the destination server and the information of the requesting source by referring to the storage device, refers to the LP table shown in FIG. 9 by the optimum LP to identify the start labels in uplink and downlink, generates an optimum LP notice including the start labels in uplink and downlink and replies the optimum LP notice to the edge router on the client side (step S171). Because the optimum LP has been stored in advance in the step S151, there is no need to carry out the identification processing of the optimum LP again, here. Incidentally, when the optimum LP cannot be identified in the storage device, the processing in FIG. 16 may be carried out. When the edge router on the client side receives the optimum LP notice including the start labels in uplink and downlink from the LP management server 3 (step S173), it modifies the request received in the step S165 to include the received start labels in uplink and downlink and transmits the request including the start labels in uplink and downlink, the IP address of the destination server and the like to the destination server (step S175). Incidentally, the edge router on the client side identifies a link of the transmission destination by referring to the link table by the start label in uplink. The next router identifies a next label by referring to the label table by the start label in uplink, and further identifies a link of the transmission destination by referring to the link table by the next label. Then, the next router replaces the start label in uplink in the received request with the next label to generate the new request to transmit the new request to the further next router. By repeating such a processing, the packet reaches the edge router on the server side.

The edge router on the server side receives the request including the label in uplink, the start label in downlink, and the IP address of the destination server from the previous router (step S177), and stores the start label in downlink and the IP address of the requesting source into a storage device such as a main memory (step S179). Then, the edge router on the server side identifies the transmission destination of the request by the IP address of the destination server, and transfers the request to the destination server (step S181).

The destination server receives the request from the edge router on the server side (step S183), carries out a predetermined processing and generates a response to transmit it (step S185). The edge router on the server side receives the response from the destination server (step S187). The processing shifts to the processing in FIG. 19 through the terminal D and E. Because FIG. 19 has been described above, the explanation is omitted here.

By carrying out such a processing, even when the destination servers are located distributedly in a wide area, the optimum routing can be carried out while taking into account the server load, and the current state of the network.

Incidentally, in the step S167, the edge router on the client side transmits the optimum LP inquiry to the LP management server 3. However, at the stage when the optimum LP is determined, the optimum LP may be notified in advance from the LP management server 3 to the edge router on the client side.

Although the embodiment of this invention was explained above, this invention is not limited to this. For example, the indexes are identified in the processing to identify the optimum server and the LP. However, it is possible that another equation is defined, and the indexes calculated according to the equation are used as a judgment reference.

In addition, the aforementioned routing policy is an example, and another routing policy may be defined. At that time, it is necessary to identify the LP and the optimum server according to the definition of the routing policy.

Furthermore, the LP management server 3 may be configured by plural computers to carry out a parallel processing.

Figures 22A, 22B, 22C, 25:
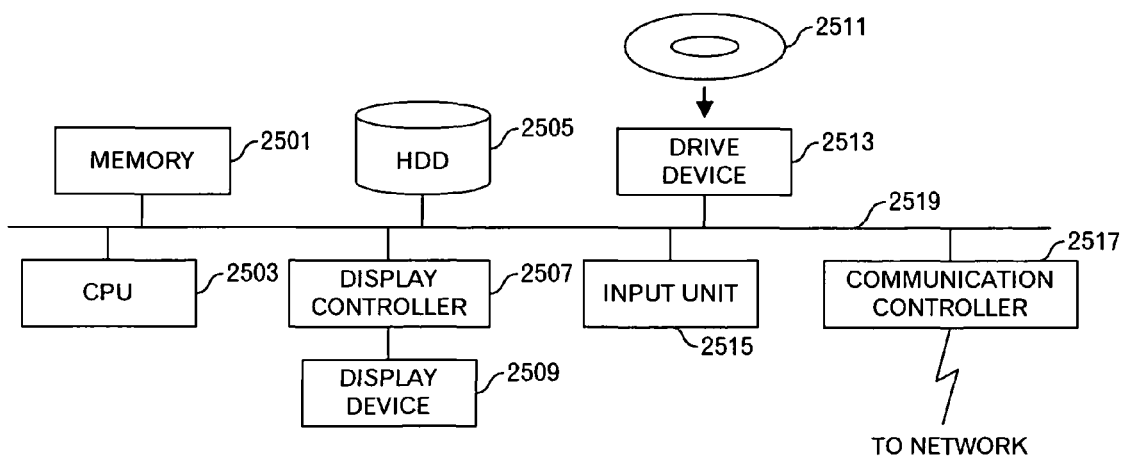
FIGS. 22A to 22C are diagrams showing a specific example of the optimum LP determination processing.
FIG. 25 is a functional block diagram of a computer system.
Figure 23:
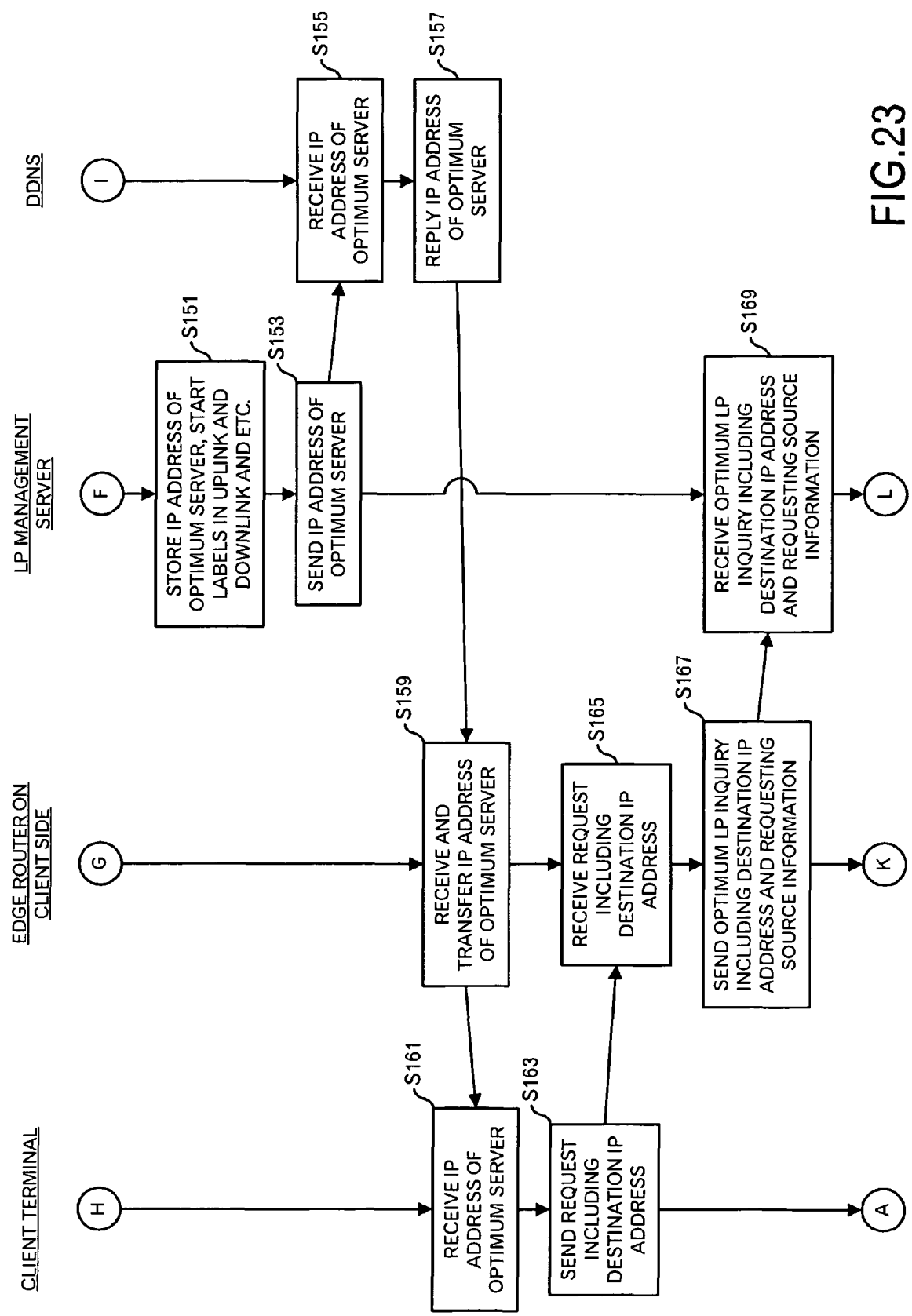
FIG. 23 is a diagram showing a processing flow (a second portion) of the broad area routing.
Figure 24:
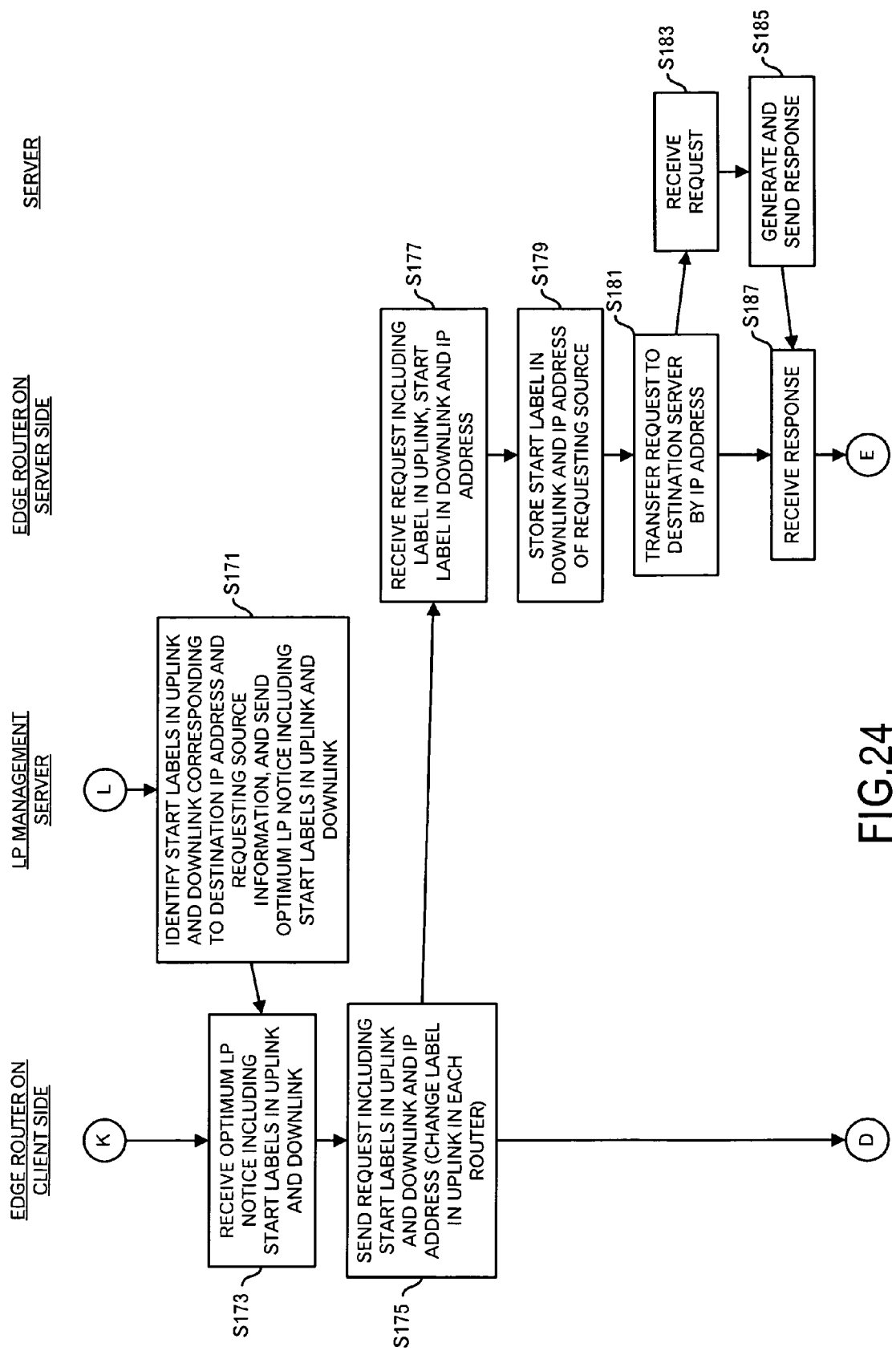
FIG. 24 is a diagram showing a processing flow (a third portion) of the broad area routing.

In addition, the LP management server 3 is a computer device as shown in FIG. 25. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. An information processing method for managing paths between arbitrary nodes in a network, said information processing method making a computer execute a process comprising:
    identifying, for each of a plurality of path candidates between specific nodes, a static transmission bandwidth that is minimum among bandwidths of links belonging to a corresponding path candidate;
    restricting the plurality of path candidates to particular path candidates based on the static bandwidth identified for each of the plurality of path candidates;
    obtaining, for each of said particular path candidates between specific nodes, first data concerning a utilization state of each link included in the path candidate, from nodes in said network;
    calculating, for each said link included in said particular path candidates, a first bandwidth that is an available bandwidth in the link by using said first data and second data of the bandwidth for each said link included in said particular path candidates;
    identifying, for each of said particular path candidates, a minimum bandwidth among said first bandwidths of said links included in a corresponding particular path candidate, as a dynamic transmission bandwidth of the corresponding particular path candidate; and
    storing the identified dynamic transmission bandwidth into a management data storage device.

2. The information processing method as set forth in claim 1, wherein said first data is a utilization ratio of each said link, and
    said calculating is carried out according to a queue model using said utilization ratio of each said link.

3. The information processing method as set forth in claim 2, further comprising:
    identifying a link having minimum dynamic bandwidth among links included in a path; and
    transmitting an intensive monitoring instruction to a node associated with the identified link.

4. The information processing method as set forth in claim 1, wherein an unique label is allocated to each said link included in said path, and said management data storage device stores labels of links included in said path, and
    in a node in said network, packet routing is controlled by data to identify, from a label, a next label in said path including a link relating to said label.

5. The information processing method as set forth in claim 1, wherein a label is allocated to each link included in a path, and the same label is allocated to a specific link commonly used in a plurality of paths,
    said management data storage device stores labels of links included in said path in association with third data to identify a link branch in a reverse direction of said path in a case where said links included in said path include said specific link, and
    in a node in said specific network, packet routing is controlled by fourth data to identify, from a designated label, a next label in said path including a link relating to said designated label, and by fifth data to identify, from said third data and said designated label, a next label in said path including said link relating to said designated label, in a case where said node is positioned at a downlink branch side of said specific link.

6. The information processing method as set forth in claim 1, wherein only a predetermined number of paths are managed in said management data storage device in accordance with static or dynamic transmission bandwidths between arbitrary two nodes.

7. A computer readable, non-transitory recording medium storing a program for managing paths between arbitrary nodes in a network, said program making a computer execute a method comprising:
    identifying, for each of a plurality of path candidates between specific nodes, a static transmission bandwidth that is minimum among bandwidths of links belonging to a corresponding path candidate;
    restricting the plurality of path candidates to particular path candidates based on the static bandwidth identified for each of the plurality of path candidates;
    obtaining, for each of said particular path candidates between specific nodes, first data concerning a utilization state of each link included in the path candidate, from nodes in said network; and
    calculating, for each said link included in said particular path candidates, a first bandwidth that is an available bandwidth in the link by using said first data and second data of the bandwidth for each said link included in said particular path candidates;
    identifying, for each of said particular path candidates, a minimum bandwidth among said first bandwidths of said links included in a corresponding path candidate, as a dynamic transmission bandwidth of the corresponding particular path candidate; and storing the identified dynamic transmission bandwidth into a management data storage device.

8. An apparatus for managing paths between arbitrary nodes in a network, comprising:

a management data storage device;

a unit to identify, for each of a plurality of path candidates between specific nodes, a static transmission bandwidth that is minimum among bandwidths of links belonging to a corresponding path candidate;

a unit to restrict the plurality of path candidates to particular path candidates based on the static bandwidth identified for each of the plurality of path candidates;

a unit to obtain, for each of said particular path candidates between specific nodes, first data concerning a utilization state of each link included in the path candidate, from nodes in said network;

a unit to calculate, for each said link included in said particular path candidates, a first bandwidth that is an available bandwidth in the link by using said first data and second data of the bandwidth for each said link included in said particular path candidates; and a unit to identify, for each of said particular path candidates, a minimum bandwidth among said first bandwidths of said links included in a corresponding particular path candidate, as a dynamic transmission bandwidth of the corresponding particular path candidate and to store the identified dynamic transmission bandwidth into said management data storage device.

* * * * *